(12) United States Patent
Naito

(10) Patent No.: US 9,412,982 B2
(45) Date of Patent: Aug. 9, 2016

(54) BATTERY PACK FOR ELECTRIC POWER TOOL

(71) Applicant: MAKITA CORPORATION, Anjo-shi, Aichi (JP)

(72) Inventor: Akira Naito, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 92 days.

(21) Appl. No.: 14/242,049

(22) Filed: Apr. 1, 2014

(65) Prior Publication Data

US 2014/0302376 A1    Oct. 9, 2014

(30) Foreign Application Priority Data

Apr. 4, 2013 (JP) ................. 2013-078794

(51) Int. Cl.
H01M 2/10 (2006.01)
(52) U.S. Cl.
CPC ............ H01M 2/1055 (2013.01); H01M 2/105 (2013.01); H01M 2220/30 (2013.01)
(58) Field of Classification Search
CPC ....................................................... H01M 2/10
See application file for complete search history.

(56) References Cited

U.S. PATENT DOCUMENTS

| 6,410,184 B1* | 6/2002 | Horiuchi et al. ............... 429/156 |
| 2009/0233161 A1* | 9/2009 | Miyamae et al. ................ 429/96 |
| 2010/0156350 A1* | 6/2010 | Murayama et al. ............ 320/128 |
| 2010/0248004 A1* | 9/2010 | Takeshita et al. .............. 429/156 |

FOREIGN PATENT DOCUMENTS

JP    A-2008-10315    1/2008

OTHER PUBLICATIONS

Fukumoto et al., Battery pack for hand-held electric tool, JP2008-010315A, Abstract English Translation, Jan. 17, 2008.*
[JP2008-010315MT.*
Extended European Search Report issued in European Patent Application No. 14163447.7 dated Aug. 25, 2014.

* cited by examiner

Primary Examiner — Patrick Ryan
Assistant Examiner — Alex Usyatinsky
(74) Attorney, Agent, or Firm — Oliff PLC

(57) ABSTRACT

A front pressing rib is formed integrally with the cell holder. The front pressing rib bridges a dimensional difference between the inside of the case to be assembled and the cell holder by generating a pressing force on the front side. That is, the cell holder is pressed rearward in the case by a pressing force of the front pressing rib that is applied to the inside of the case. The front pressing rib serves to completely bridge the dimensional difference when the cell holder is inserted into the case.

8 Claims, 30 Drawing Sheets

BATTERY PACK FOR ELECTRIC POWER TOOL

This application claims priority to Japanese patent application serial number 2013-78794, the contents of which are incorporated herein by reference.

BACKGROUND OF THE INVENTION

1. Field of the Invention

The present invention relates to a battery pack for an electric power tool that is detachably mounted on a tool body of the electric power tool as a power source for the electric power tool.

2. Description of the Related Art

A battery pack for an electric power tool, which is detachably mounted on a tool body as a power source, has been used in electric power tools. A user can conveniently use an electric power tool when the battery pack for the electric power tool is mounted on the tool body. The battery pack for an electric power tool generally includes a case that serves as a housing as well as forming an outer package, and a battery body that is provided in the case. The case is generally formed by combining an upper and a lower case. Further, the battery body includes a plurality of battery cells that can be charged and discharged and a circuit board that controls the charging and discharging of the plurality of battery cells. The plurality of battery cells are generally held in the case by a support structure that is called a cell holder (for example, refer to Japanese Laid-Open Patent Publication No. 2008-10315). One end of an electrode member is connected to an electrode of the battery cell, which is held by the cell holder, typically using welding or the like. Current is allowed to flow via the electrode members. The opposite end of the electrode member is connected to the circuit board, which is supported by the cell holder, typically using welding or the like.

The above-mentioned cell holder is assembled into the case and disposed in the case. For this reason, a clearance, which is required for disposition and assembling, is needed between the inside of the case and the cell holder.

On the other hand, the clearance formed for this purpose generates rattling of the cell holder in the case. The rattling of the cell holder may cause the movement of the battery cells to be different from that the electrode members connected to the electrodes of the battery cells. The above movement needs to be reduced as much as possible so as not to apply a load to the above-connected areas.

SUMMARY OF THE INVENTION

Thus, there is a need in the art to provide an improved battery pack for an electric power tool that is detachably mounted on a tool body of the electric power tool serving as a power source for the electric power tool. Such a battery pack would suppress the rattling of a cell holder relative to a case in which the cell holder is assembled without increasing the number of parts while maintaining relative ease in inserting the cell holder into the case.

According to a first aspect of the invention, there is provided a battery pack for an electric power tool that is detachably mounted on a tool body of the electric power tool serving as a power source for the electric power tool and includes a case, battery cells, and a cell holder that is assembled into the case and covers at least a part of the battery cells. Further, a dimensional difference interposition member serves to bridge a dimensional difference between the cell holder and the inside of the case by generating a pressing force applied to the case when the cell holder is assembled. The dimensional difference interposition member is preferably molded integrally with the cell holder.

For this reason, the dimensional difference interposition member is formed at the cell holder by not being formed as a separate member but being molded integrally with the cell holder. Accordingly, it is possible to suppress the rattling of the cell holder relative to the case without increasing the number of parts.

In the related art, when a battery pack for an electric power tool is mounted on a tool body of an electric power tool, vibration of the tool during use of the electric power tool or impact applied to the electric power tool from the outside is applied to the battery pack for an electric power tool. In this cases terminals of the electric power tool and the battery pack for an electric power tool may rub against each other, and these terminals can be worn out. For this reason, the life of the terminal may be shortened. However, in an improved battery pack for an electric power tool, it is possible to suppress the rattling of the cell holder relative to the case in which the cell holder is inserted. It is possible, therefore, to improve the contact between the case and the cell holder and to suppress the movement of the cell holder relative to the tool body. Accordingly, since it is possible to suppress wear caused by the rubbing between terminals, the life of these terminals can be lengthened According to a second aspect of the invention, the dimensional difference interposition member may serve to bridge the dimensional difference while the cell holder is assembled into the case. It may also serve to completely bridge the dimensional difference when the cell holder is finally inserted into the case.

For this reason, the dimensional difference interposition member does not serve to bridge the dimensional difference until the time immediately before the cell holder is inserted into the case. Accordingly, it is possible to sufficiently secure a clearance for assembling until the cell holder is inserted into the case. Therefore, it is possible to maintain relative ease in inserting the cell holder into the case. Further, since the dimensional difference interposition member serves to bridge the dimensional difference while the cell holder is inserted into the case, it is possible to completely bridge the clearance for assembling when the cell holder is completely assembled. Accordingly, it is possible to suppress the rattling of the cell holder relative to the case. Therefore, while maintaining relative ease in inserting the cell holder into the case, it is possible to suppress the rattling of the cell holder relative to the case.

According to a third aspect of the invention, the dimensional difference interposition member may be provided at a forward position or a rearward position with respect to an assembling direction of the cell holder into the case.

For this reason, the dimensional difference interposition member does not cause obstruction until the cell holder is completely inserted into the case. Accordingly, it is possible to sufficiently secure a clearance for assembling until the cell holder is inserted into the case. Therefore, it is possible to maintain relative ease in inserting the cell holder into the case.

According to another aspect of the invention, the dimensional difference interposition member is produced by cutting out the cell holder, and serves to bridge the dimensional difference by the elasticity thereof when the cell holder is completely inserted into the case.

For this reason, it is possible to simply provide the dimensional difference interposition member on the cell holder. Here, since the dimensional difference interposition member serves to bridge a dimensional difference by the elasticity thereof when the cell holder is completely inserted into the case, the dimensional difference interposition member can completely bridge a clearance for assembling when the cell holder is completely inserted. Accordingly, it is possible to suppress the rattling of the cell holder relative to the case. Therefore, while maintaining relative ease in inserting the cell holder into the case, it is possible to suppress the rattling of the cell holder relative to the case in which the cell holder is assembled.

According to another aspect of the invention, there is provided a battery pack for an electric power tool that is detachably mounted on a tool body of the electric power tool and serving as a power source of the electric power tool which includes a case, battery cells, and a cell holder that is assembled into the case and covers at least a part of the battery cells. Further, a dimensional difference interposition member serves to bridge a dimensional difference between the cell holder and the inside of the case by generating a pressing force applied to the case when the cell holder is assembled. The dimensional difference interposition member may be molded integrally with the case.

For this reason, the dimensional difference interposition member can bridge a dimensional difference between the cell holder and the inside of the case by generating a pressing force that is applied to the case when the cell holder is assembled. Accordingly, it is possible to suppress the rattling of the cell holder relative to the case in which the cell holder is assembled.

According to another aspect of the invention, the dimensional difference interposition member may be formed in at least one of the opposite ends of the cell holder or the case along a direction orthogonal to the longitudinal direction of the battery cell. For this reason, it is possible to bridge a dimensional difference between the inside of the case and the cell holder by generating a pressing force on one side and to set the other side as a reference surface to which the cell holder is fixed. Accordingly, the cell holder can be accurately positioned in the case to produce a battery pack.

According to another aspect of the invention, the dimensional difference interposition member is formed in at least one opposite end of the cell holder or the case along the longitudinal direction of the battery cell. For this reason, it is possible to bridge a dimensional difference between the inside of the case and the cell holder by generating a pressing force on one side and to set the opposite side as a reference surface to which the cell holder is fixed. Accordingly, the cell holder can be accurately positioned to the case to produce a battery pack.

DESCRIPTION OF THE PREFERRED EMBODIMENTS

Each of the additional features and teachings disclosed above and below may be utilized separately or in conjunction with other features and teachings to provide an improved battery pack for an electrical power tool. Representative examples of the present teaching, which examples utilize many of these additional features and teachings both separately and in conjunction with one another, will now be described in detail with reference to the attached drawings. This detailed description is merely intended to teach a person of skill in the art farther details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

First Embodiment

Figure 1:
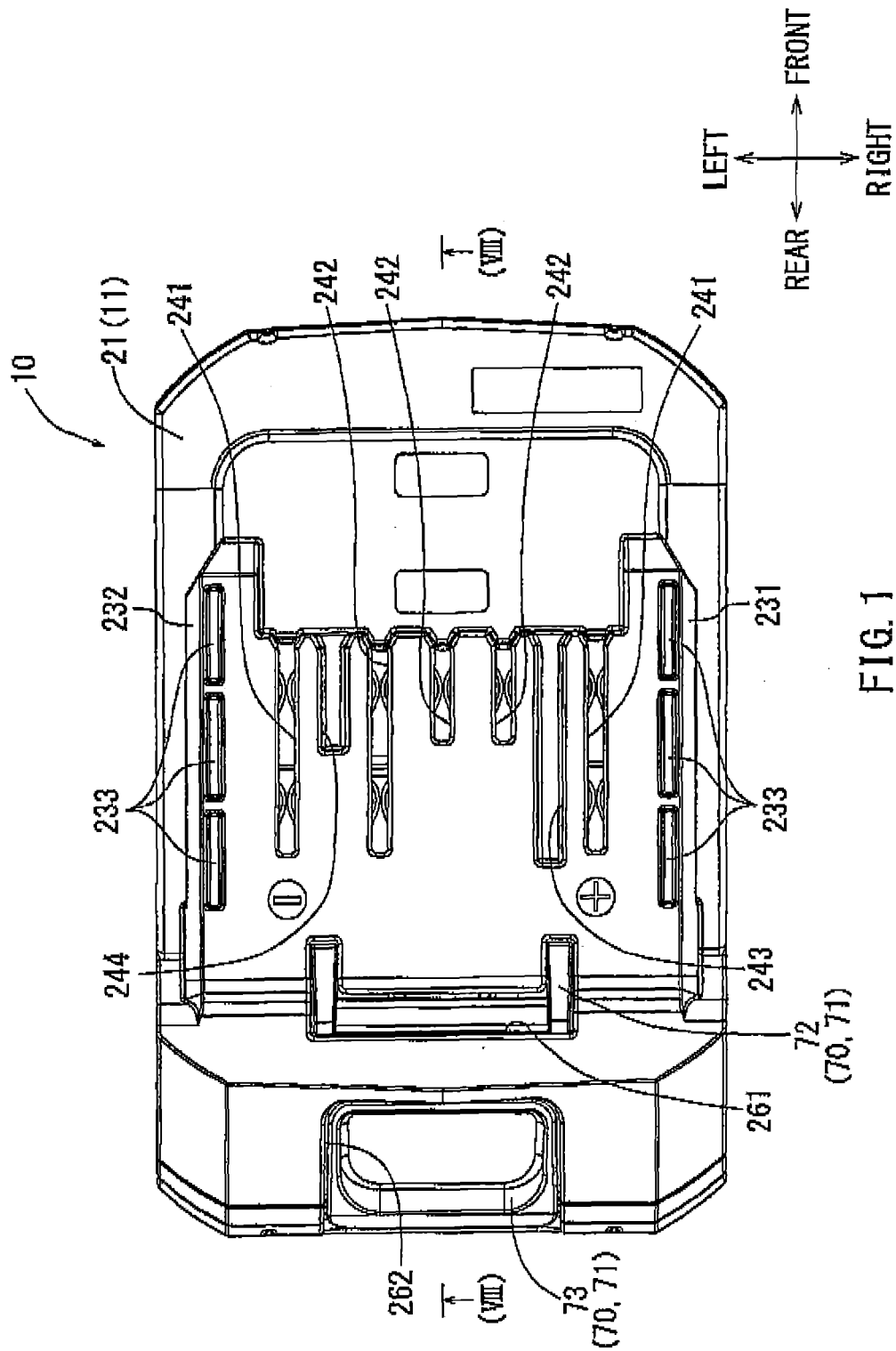
FIG. 1 is a view showing the upper surface of a battery pack according to a first embodiment.
Figure 2:
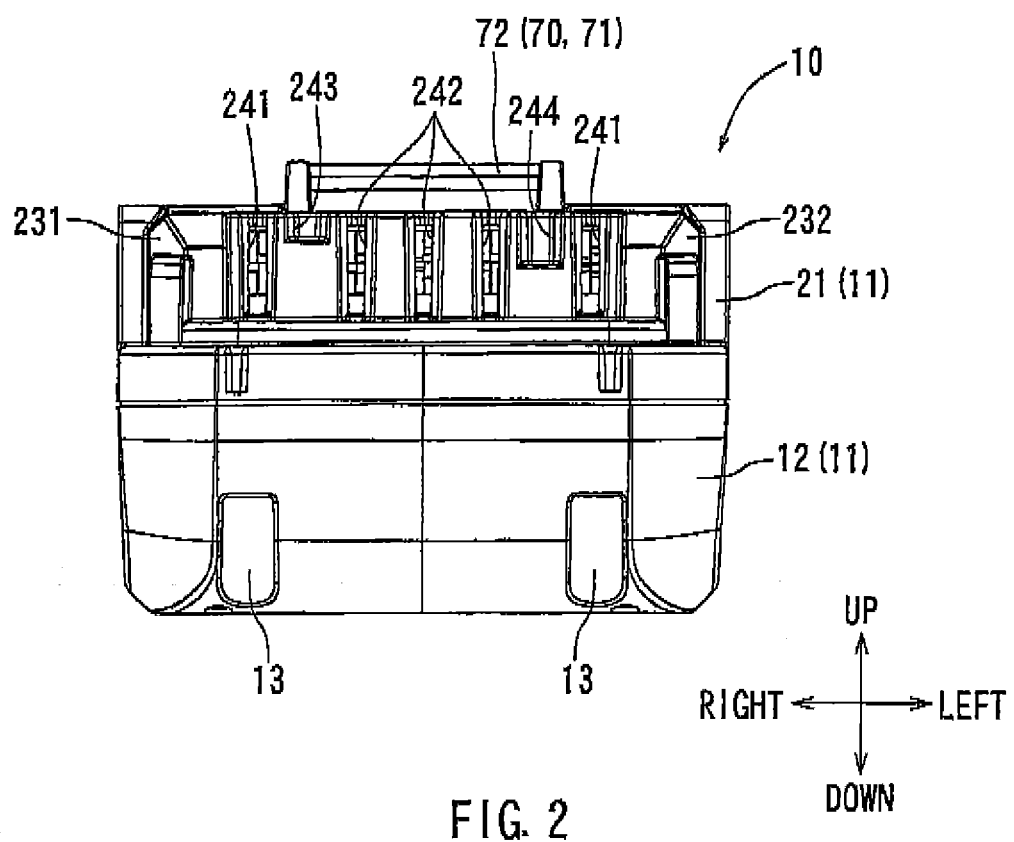
FIG. 2 is a view showing the front surface of the battery pack of FIG. 1.

A battery pack for an electric power tool according to a first embodiment of the invention will be described below with reference to FIGS. 1 to 18. Reference numeral 10 shown in FIG. 1 denotes a battery pack that corresponds to a battery pack for an electric power tool according to an embodiment of the invention. The battery pack 10 is a rechargeable battery that is adapted to be detachably mounted via sliding onto tool bodies of various electric power tools typified by, for example, an electric screwdriver. The battery pack 10, which is mounted on a tool body, functions as a power source of an electric power tool. For this purpose, when the amount of the charge of the battery pack 10 is reduced, the battery pack 10 is detached from the tool body and is mounted on a dedicated charger so as to be charged. The battery pack 10, which has been completely charged by the dedicated charger, is mounted on the tool body again as a power source for the electric power tool. Meanwhile, the front side of the battery pack 10, which is defined in the drawings, is set in a direction based on a direction in which the battery pack 10 is slidably mounted. Further, the upper side of the battery pack 10, which is defined in the drawings, is set in a direction based on a direction in which the battery pack 10 is mounted on a tool body (not shown).

Figure 3:
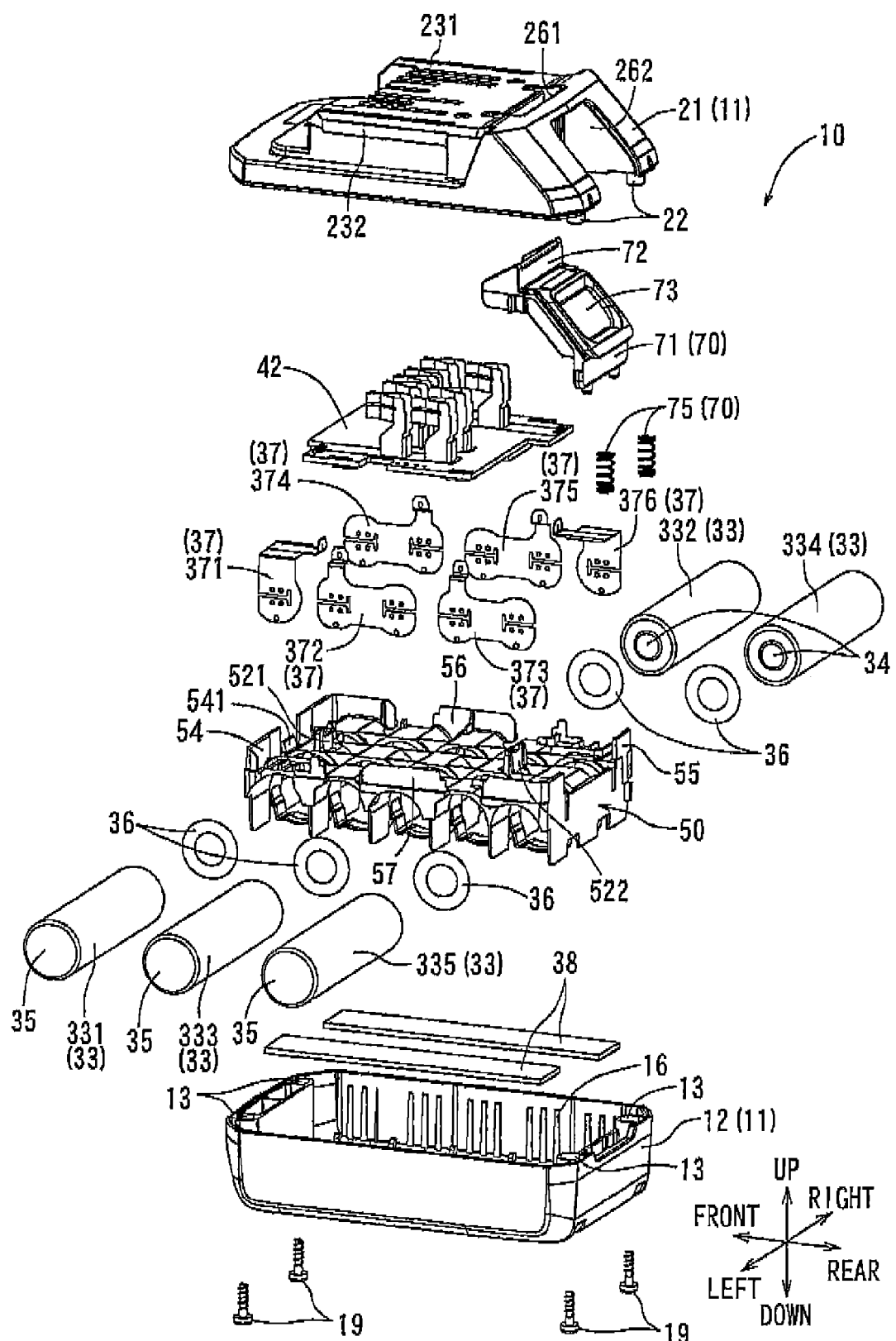
FIG. 3 is an exploded perspective view of the entire battery pack of FIG. 1.

As shown in FIGS. 1 to 7, the battery pack 10 includes a case 11 and the battery body 30 (refer to FIG. 4) that is provided in the case 11. The case 11 functions as a housing that accommodates the battery body 30 while forming the exterior of the battery pack 10. The case 11 is formed so as to have a structure that is divided into two (upper and lower) pieces. The upper and lower cases 12 and 21 are combined with each other in a vertical direction, to form the case 11. As shown in FIG. 3, the combined state of the upper and lower cases 12 and 21, may be maintained by screw members 19. The case 11, which is formed by the combination of an upper and a lower case as described above, forms a box-shaped space in which the battery body 30 can be provided.

Figure 4:
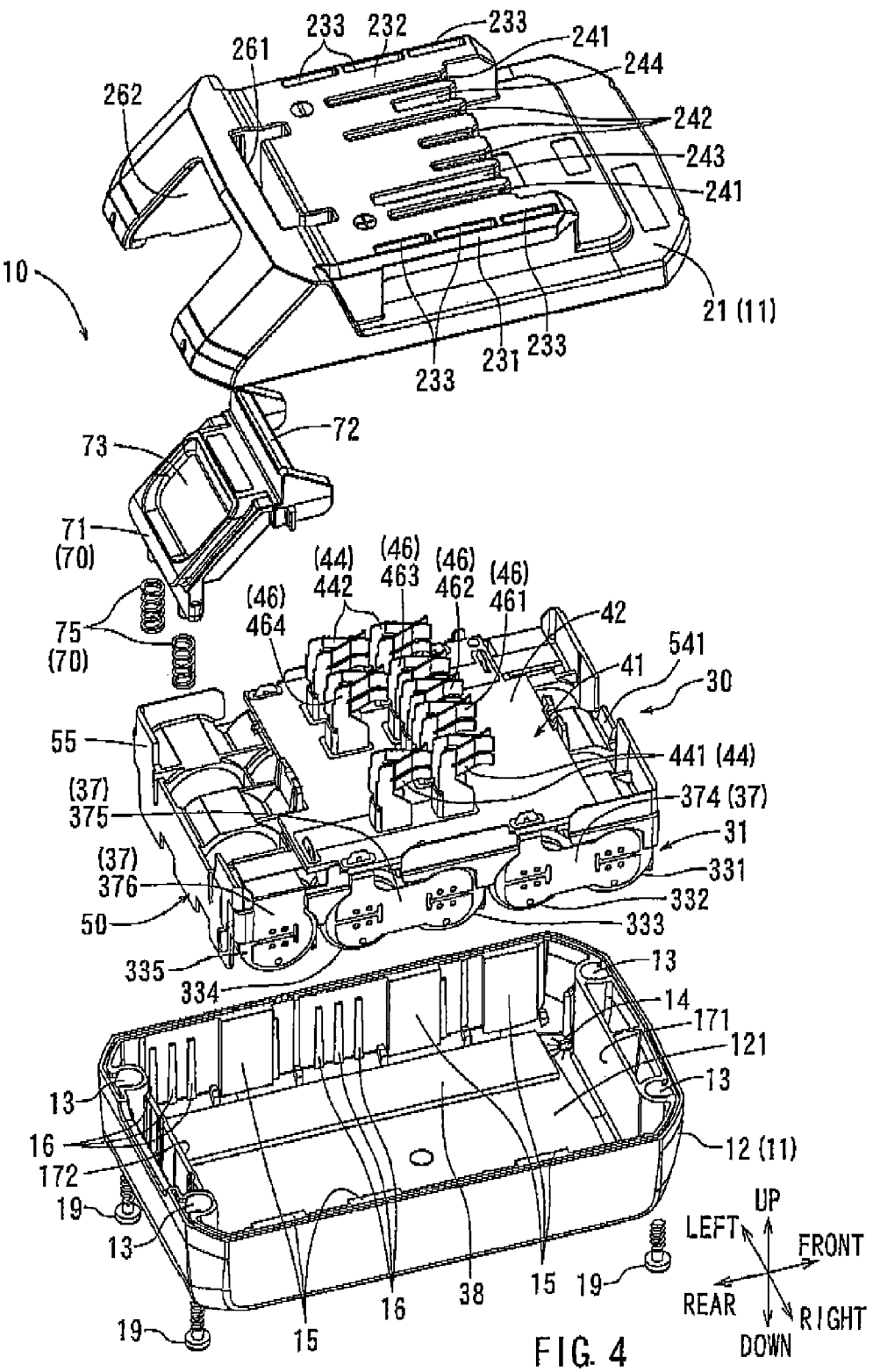
FIG. 4 is an exploded perspective view of the battery pack of FIG. 3 that is assembled with a battery body.
Figure 5:
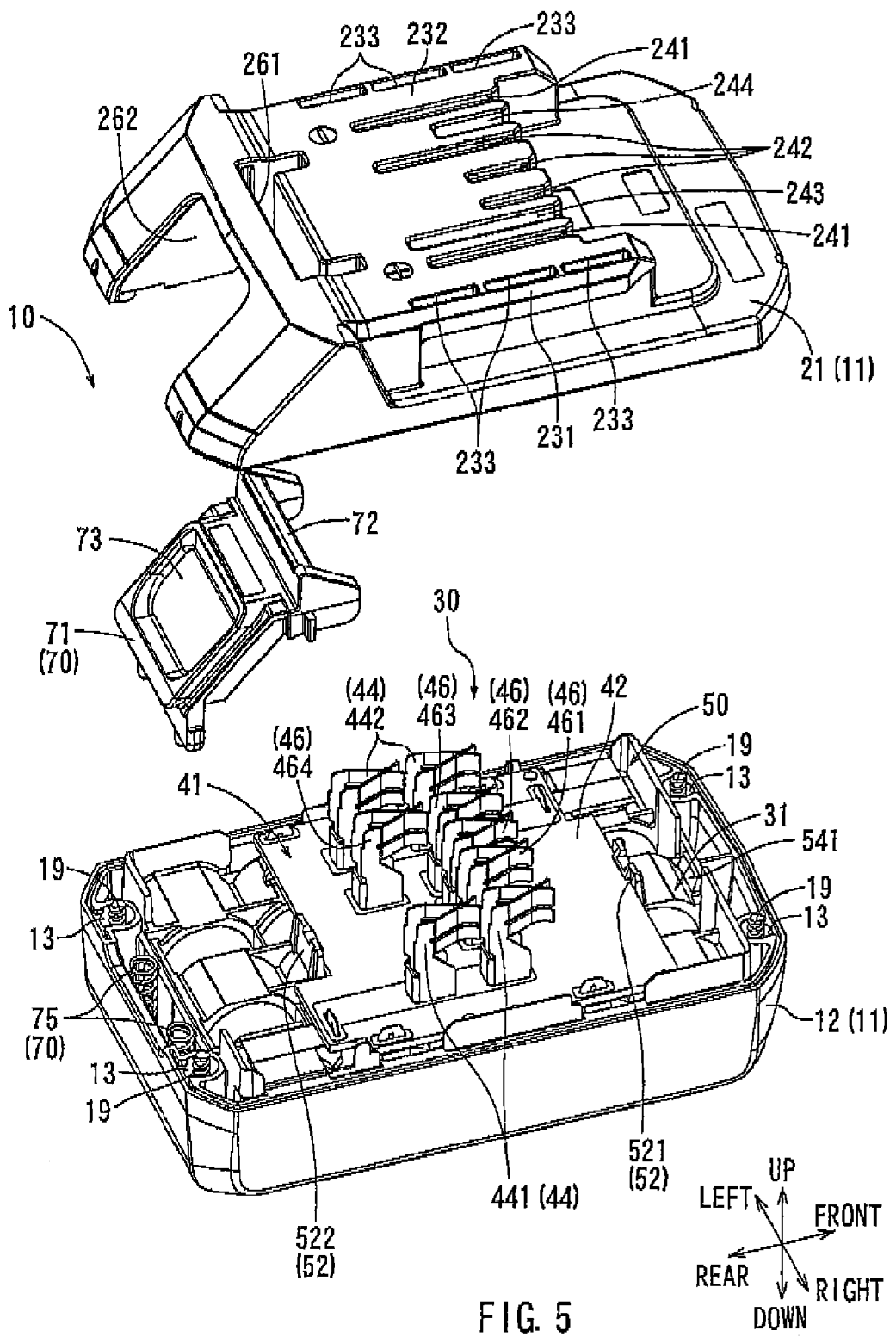
FIG. 5 is an exploded perspective view of the battery pack of FIG. 3 of which the battery body is housed in a lower case.

As shown in FIGS. 3 and 4, the lower case 12 is substantially formed in the shape of a box with an open upper surface. The lower case 12 is substantially formed in the shape of a box that receives a battery portion 31 of the battery body 30 to be described below. Specifically, as shown in FIG. 5, the lower case 12 is formed so as to have dimensions in which five battery cells 33 arranged in parallel in a front-and-rear direction can be housed in the front-and-rear direction, a left-and-right direction, and/or an up-and-down direction. That is, the lower case 12 is formed so that a circuit board 42 (controller 41) of the battery body 30 protrudes upward from the housing area of the lower case 12.

Figure 6:
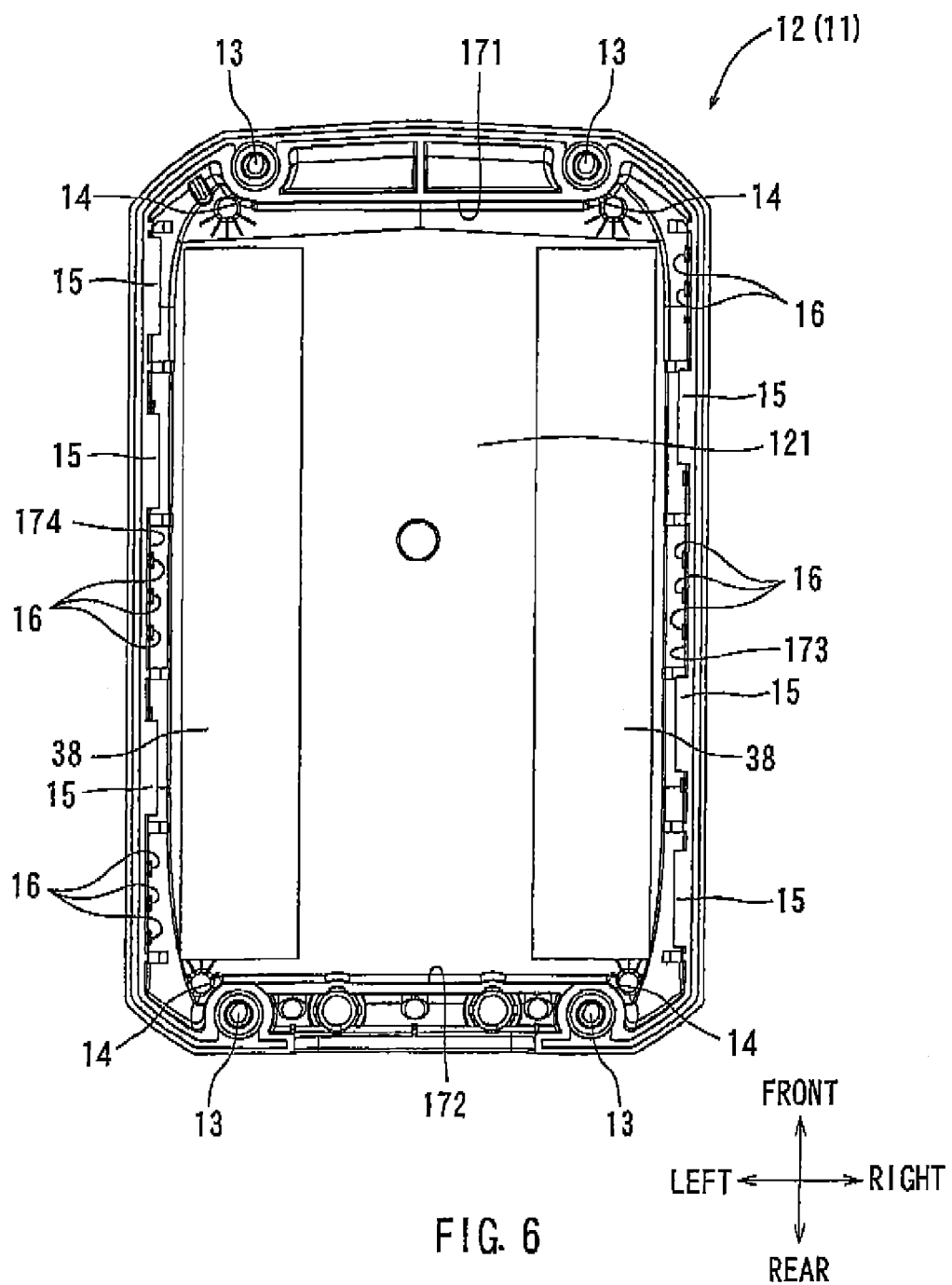
FIG. 6 is a top view showing the inside of the lower case from which the battery body is detached.
Figure 7:
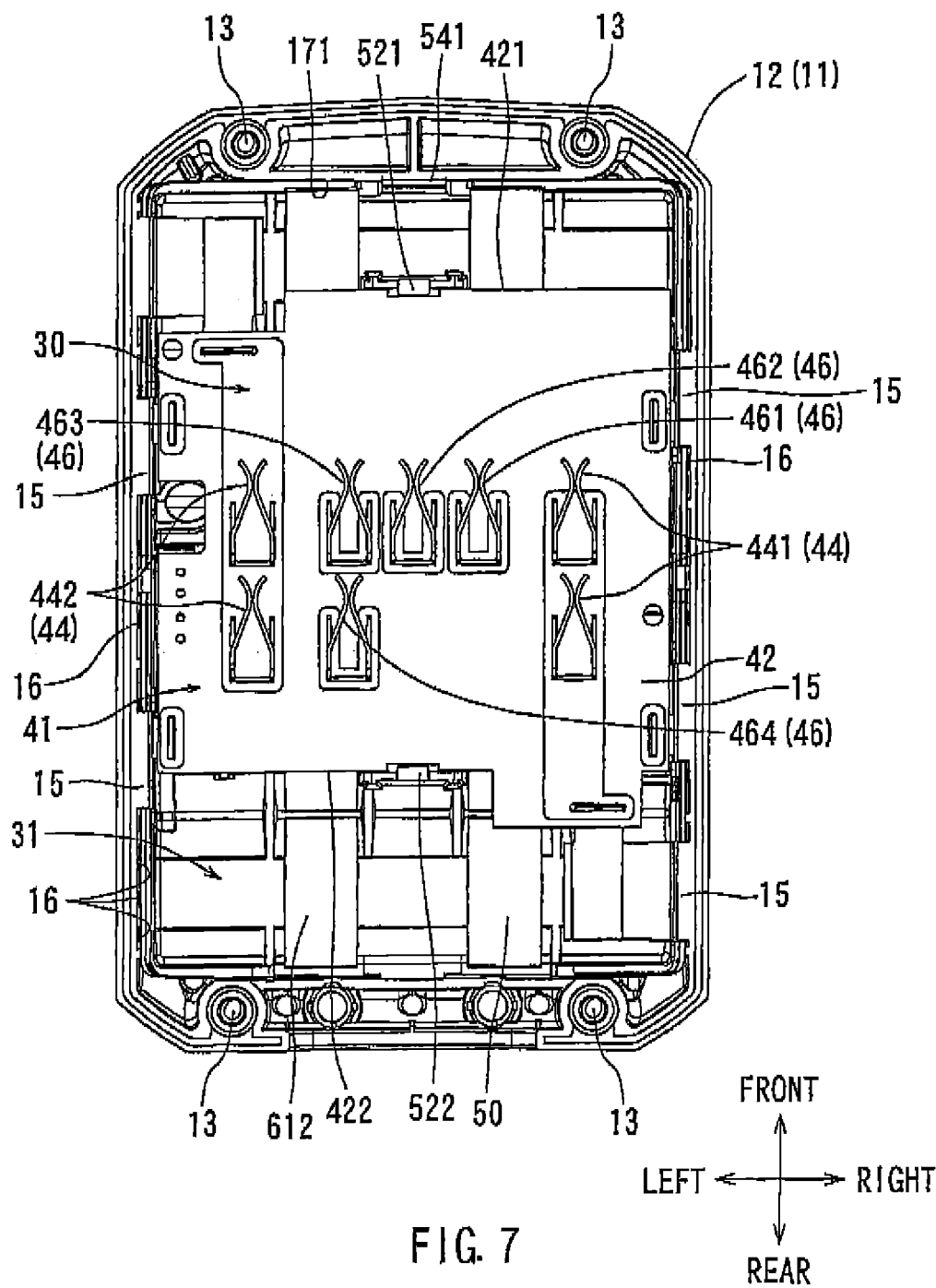
FIG. 7 is a top view showing the inside of the lower case in which the battery body is housed.

As shown in FIGS. 4 and 6, screw holes 13 for fastening are formed at the side corner edges of the lower case 12. Further, as shown in FIGS. 4 and 6, drain holes 14 through which water present in the lower case is drained to the outside are formed at the bottom corner edges of the lower case 12. Furthermore, support ribs 15 and pressure ribs 16 are formed on both left and right inner surfaces of the lower case. The support ribs 15 are formed so as to protrude in a substantially rectangular shape. The support ribs 15 are set at portions that are fitted to gap portions 561 and 571 of a cell holder 50 to be described below and restrict the movement of the cell holder 50 in the lower case 12 in the front-and-rear direction. Moreover, the pressure ribs 16 are formed so as to protrude substantially in the shape of a protrusion that extends in the up-and-down direction. The pressure rib 16 comes into contact with a lead plate 37 so as to press the lead plate 37 toward the battery cell 33. The pressure rib 16 is set so that an area of the pressure rib 16 coming into contact with the lead plate 37 increases toward the lower side. Meanwhile, as described below, the controller 41 disposed on the upper side of the battery portion 31 is housed in the upper case 21.

As shown in FIG. 3, the upper case 21 is disposed on the upper side of the lower case 12. The upper case 21 is fastened by the screw members 19 so as to be integrally coupled to the lower case 12. That is, screw bosses 22 with which the screw members 19 are inserted into the screw holes 13 of the lower case 12 are threadably engaged are formed at the upper case 21. The upper case 21 is formed substantially in the shape of a box which can house the controller 41 of the battery body 30 to be described below. The lower surface of the upper case 21 is opened.

The upper case 21 forms a connection-side exterior when the battery pack 10 is slidably mounted on the device body (the tool body of the electric power tool or the dedicated charger). Slide guide portions 231 and 232, which are provided on the left and right sides, are formed in the middle portion of the upper case 21. The slide guide portions 231 and 232 guide the battery pack 10 so that it can be slidably mounted on a device body such as a tool body. For this purpose, the slide guide portions 231 and 232 are formed in the shape of flanges that protrude on the left and right sides so as to extend in the front-and-rear direction in which the battery pack can be slidably mounted. Recessed portions 233 are formed at each of the slide guide portions 231 and 232. The recessed portion 233 has the function of suppressing the transmission of vibration. Such vibration is caused by the driving of the electric power tool and is transmitted to the battery cell 33 when the battery pack 10 is mounted on the electric power tool. Further, charge/discharge terminals 44 and signal terminals 46 to be described below are formed at the upper case 21 so as to be capable of being electrically connected to terminals of the device body. That is, slits 241 for the charge/discharge terminals and slits 242 for the signal terminals are formed at the upper case 21. These slits 241 and 242 are formed so that male external terminals formed in the shape of a plate can be inserted into the slits. Furthermore, guide slits 243 and 244, which are used to slidably mount the battery pack 10 on the device body, are formed on the upper case 21.

Moreover, a hook opening 261 and an operation opening 262 are formed on the upper case 21. The hook opening 261 is an opening through which a hook portion 72 of a male hook mechanism 70 can protrude to the outside. The hook portion 72 protruding from the hook opening 261 can engage a female portion of an external electric power tool or dedicated charger (not shown). The operation opening 262 is an opening through which an operation portion 73 of the male hook mechanism 70 can be exposed to the outside. The engagement of the hook portion 72, protrudes to the outside from the hook opening 261. A user can release the engagement of the hook portion 72 using the operation portion 73 which can be operated from the operation opening 262.

The male hook mechanism 70 has a structure that can be detachably locked to the device body when the battery pack 10 is slidably mounted on the device body. That is, as shown in FIG. 3 and FIG. 4, the male hook mechanism 70 includes a hook-shaped structure 71 that has the shape of a hook/finger-hook, and biasing springs 75 that bias the hook-shaped structure 71 in a locking direction. The hook-shaped structure 71 includes the above-mentioned hook portion 72 and the operation portion 73. The male hook mechanism 70, which is formed as described above, is adapted to automatically lock the hook portion 72 to the female portion of the device body by the biasing forces of the biasing springs 75. Further, when the operation portion 73 is pulled down against the biasing forces of the biasing springs 75, the locking of the hook portion 72 to the female portion of the device body can be released and the battery pack 10 can be slid so as to be detached from the device body.

The upper case 21, which is disposed on the upper side, is fastened to the lower case 12, which is formed as described above, by the screw members 19, so that the case 11 is formed. A structure, which makes the combined state of the upper and lower cases more firm, is provided between the combined lower and upper cases 12 and 21. That is, as shown in portions that are shown in extracted circles in FIGS. 8 to 10, a fitting recessed groove 181 is formed at an opening edge 18 of the lower case 12. The fitting recessed groove 181 opens upward along the opening edge 18. The fitting recessed groove 181 is formed along the opening edge 18 at the middle portion of the opening edge 18 in a thickness direction. For this reason, the fitting recessed groove 181 is formed over the entire opening edge 18 that is formed at all the front, rear, left, and right portions of the lower case 12. The width of the fitting recessed groove 181 is set to about a third of the thickness of the opening edge 18. Further, the depth of the fitting recessed groove 181 is set to be substantially equal to the thickness of the opening edge 18.

In contrast, a fitting protrusion 281, which is to be fitted to the fitting recessed groove 181, is formed at an opening edge 28 of the upper case 21 which is opened downward. The fitting protrusion 281 is formed over the entire opening edge 28 that is formed at the front, rear, left, and right portions of the upper case 21, and is formed so as to have a protruding width and a protruding length corresponding to the depth of the fitting recessed groove 181 formed in the lower case 12. Specifically, the protruding width of the fitting protrusion 281 is set to about a third of the thickness of the opening edge 28. Further, the protruding length of the fitting protrusion 281 is set to be substantially equal to the thickness of the opening edge 28.

According to a relationship between the fitting recessed groove 181 and the fitting protrusion 281 that are fitted to each other with these setting items, the opening edges 18 and 28 are firmly joined to each other. That is, even though a load is applied to the upper case 21 relative to the lower case 12 or a load is applied to the lower case 12 relative to the upper case 21, the relative displacement between the upper and lower cases can be significantly suppressed.

Next, the battery body 30, which is disposed in the above-mentioned case 11, will be described. The battery body 30 serves various functions in the rechargeable battery pack 10. As shown in FIG. 4, the battery body 30 includes a battery portion 31 and a controller 41. As shown in FIG. 3, the battery portion 31 includes five battery cells 33 (331, 332, 333, 334, and 335). The battery cell 33 typically has a columnar shape and can be charged and discharged. The battery cells 33 are sequentially a first battery cell 331, a second battery cell 332, a third battery cell 333, a fourth battery cell 334, and a fifth battery cell 335 as arranged beginning from the front side. The five battery cells 33 extend in the left-and-right direction and are transversely arranged in parallel in the front-and-rear direction. For this reason, positive and negative electrodes 34 and 35 of the five battery cells 33 are disposed on both left and right ends of the battery cells. Meanwhile, as shown in FIG. 3, an insulation sheet 36 is mounted on each of the positive electrodes 34.

Lead plates 37 (371, 372, 373, 374, 375, and 376), which electrically connect the electrodes 34 and 35, are provided on the electrodes 34 and 35 that are disposed on both left and right ends of the five battery cells 33. That is, as shown in FIG. 3, a first lead plate 371, a second lead plate 372, a third lead plate 373, a fourth lead plate 374, a fifth lead plate 375, and a sixth lead plate 376 are connected to the electrodes 34 and 35, which are disposed on both left and right ends of the battery cells 33, through welding. These lead plates 37 (371, 372, 373, 374, 375, and 376) correspond to electrode members of the invention. The five battery cells 33 are held by the cell holder 50 described in detail below. Further, reference numeral 38 shown in the drawings denotes cushioning mats that are laid on an inner bottom 121 forming the inner surface of the lower case 12. The cushioning mat 38 is molded with an elastic resin so as to have the shape of a sheet. The cushioning mat 38 is formed so as to extend over a range in which the battery cells 33 are arranged side by side in the front-and-rear direction. The cushioning mats 38 are provided with an appropriate interval interposed therebetween so as to secure the positions of cell holding portions 63 of the cell holder 50 described in detail below.

The controller 41 is disposed on the upper side of the battery portion 31. The controller 41 includes the circuit board 42 that performs various kinds of control processing. The circuit board 42 is provided with a microcomputer, monitors the states of the battery cells 33 through the lead plates 37, and performs controls relating to charge and discharge. For this purpose, the upper ends of the lead plates 37, which are mounted on the electrodes 34 and 35 disposed on both left and right ends of the five battery cells 33, are electrically connected to the circuit board 42. Specifically, the upper ends of these lead plates 37 (371, 372, 373, 374, 375, and 376) are connected to the circuit board 42 through welding. These lead plates 37 are connected to the electrodes 34 and 35 of the battery cell 33 and the circuit board 42 through welding.

The charge/discharge terminals 44 and the signal terminals 46 are provided on the upper surface of the circuit board 42. The charge/discharge terminals 44 and the signal terminals 46 function as terminals electrically connected to a tool body or a dedicated charger (not shown) serving as a device body. Leaf spring-like metal terminals are disposed so as to face each other, so that the charge/discharge terminals 44 and the signal terminals 46 are formed. The charge/discharge terminals 44 function as discharge terminals when the battery pack 10 is mounted on a tool body as a power source. Further, the charge/discharge terminals 44 function as charge terminals when the battery pack 10 is mounted on a dedicated charger. For this purpose, the charge/discharge terminal 44 includes a positive connection terminal 441 that is connected to, for example, a positive terminal of the tool body and a negative connection terminal 442 that is connected to, for example, a negative terminal of the tool body. Each of the positive connection terminal 441 and the negative connection terminal 442 is provided so that two terminals are arranged in parallel in the front-and-rear direction.

The four signal terminals 46 are provided. When the battery pack 10 is mounted on the device body, each of the three signal terminals 46 is formed as a terminal that transmits and receives information between the device body and the battery pack. That is a first signal terminal 461 functions as a signal terminal that transmits a charge completion signal to a dedicated charger. Specifically, when the circuit board 42 determines that the voltage of the battery cell 33 becomes equal to or higher than a predetermined threshold, the first signal terminal 461 transmits a charge completion signal to the dedicated charger so as to stop the charging of the dedicated charger. Further, a second signal terminal 462 functions as a signal terminal that transmits monitoring voltage information about the temperature of the battery cell 33 to the dedicated charger. Specifically, when the temperature of the battery cell 33 reaches an abnormal temperature, the circuit board determines that the temperature of the battery cell 33 reaches an abnormal temperature and the second signal terminal 462 transmits the monitoring voltage information to the dedicated charger so as to stop the charging of the dedicated charger. Furthermore, a third signal terminal 463 functions as a signal terminal that transmits an overcharge prevention signal to the dedicated charger. Specifically, when the charge control of the dedicated charger cannot be stopped by the first signal terminal 461, the third signal terminal 463 transmits the overcharge prevention signal to the dedicated charger to be connected from the third signal terminal 463. When this occurs, charging of the dedicated charger is stopped so that the battery pack 10 is not overcharged. Moreover, a fourth signal terminal 464 functions as a signal terminal that transmits an over discharge prevention signal to a tool body. Specifically, when the circuit board 42 judges that the voltage of the battery cell 33 becomes equal to or lower than a predetermined threshold, the fourth signal terminal 464 transmits a discharge stop signal to the tool body so as to stop the discharging of the tool body. Meanwhile, the signal terminals 46, which are not required to be electrically connected to each other, are arranged as fax apart as possible. Further, information, which is to be transmitted and received by the above-mentioned signal terminal 46, is not limited to the above-mentioned signals, and may be appropriate information about the battery pack 10 or the device body. Furthermore, signals, which are to be transmitted and received, typically include information based on the control processing of the circuit board 42.

Next, the cell holder 50, which holds the above-mentioned battery cells 33, will be described with reference to FIGS. 8 to 18.

The cell holder 50 is formed to hold the five battery cells 33 together, in order to make the five battery cells 33 (331, 33E 333, 334, and 335) be housed and held in the lower case 12. Meanwhile, the cell holder 50 is assembled in the lower case 12 while covering at least a part of the battery cells 33. That is the cell holder 50 functions to partition the inside of the lower case 12 so that the battery cells 33 can be disposed in the lower case 12. The cell holder 50 is molded from an appropriate plastic resin. The cell holder 50 includes an outer rim body 51 that forms a framework of the cell holder 50, and cell receiving portions 60 (601, 602, 603, 604, and 605) that are supported by the outer rim body 51 and receive the battery cells 33.

Figure 8:
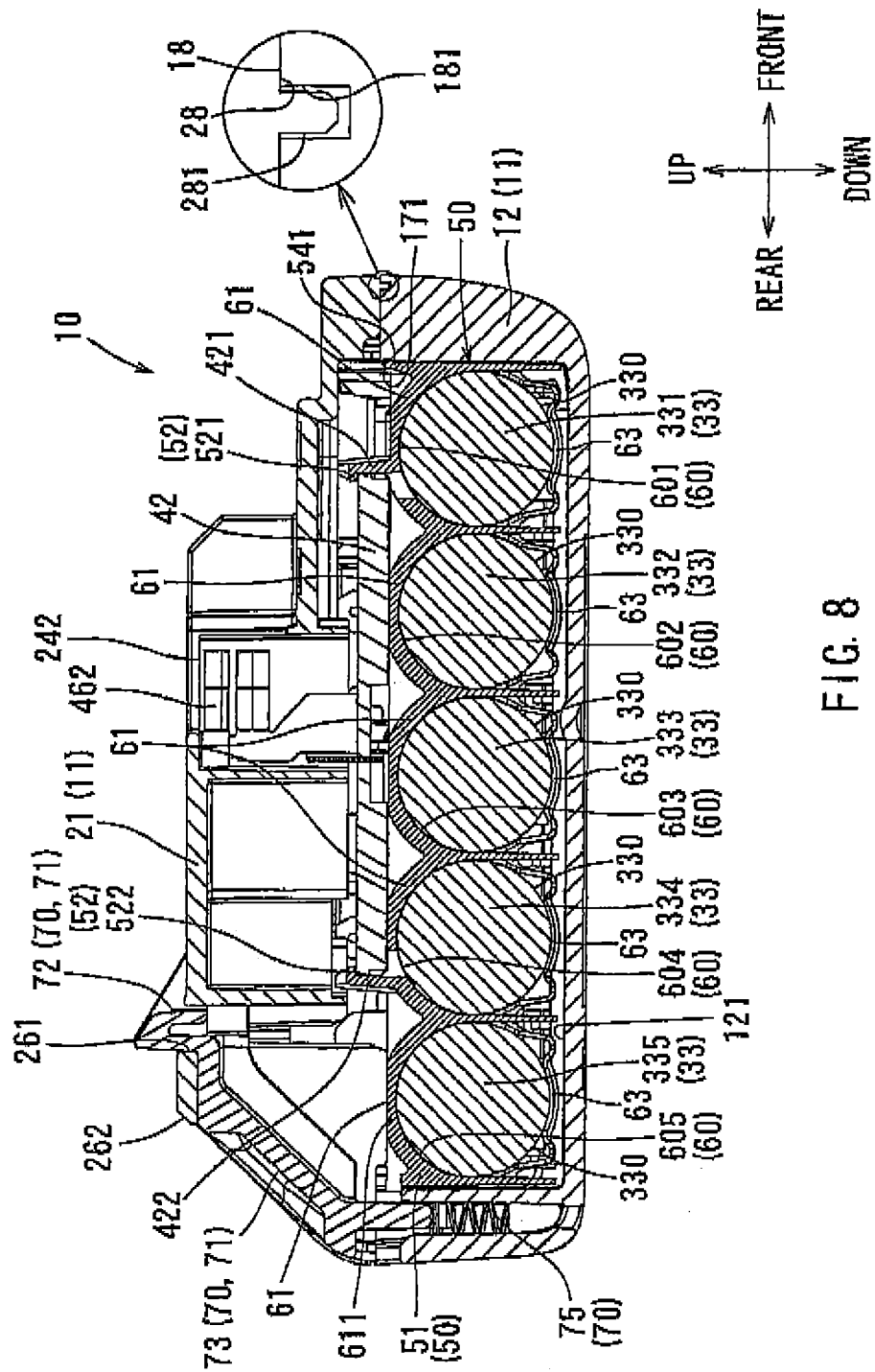
FIG. 8 is a cross-sectional view taken along line (VIII)-(VIII) of FIG. 1.
Figure 9:
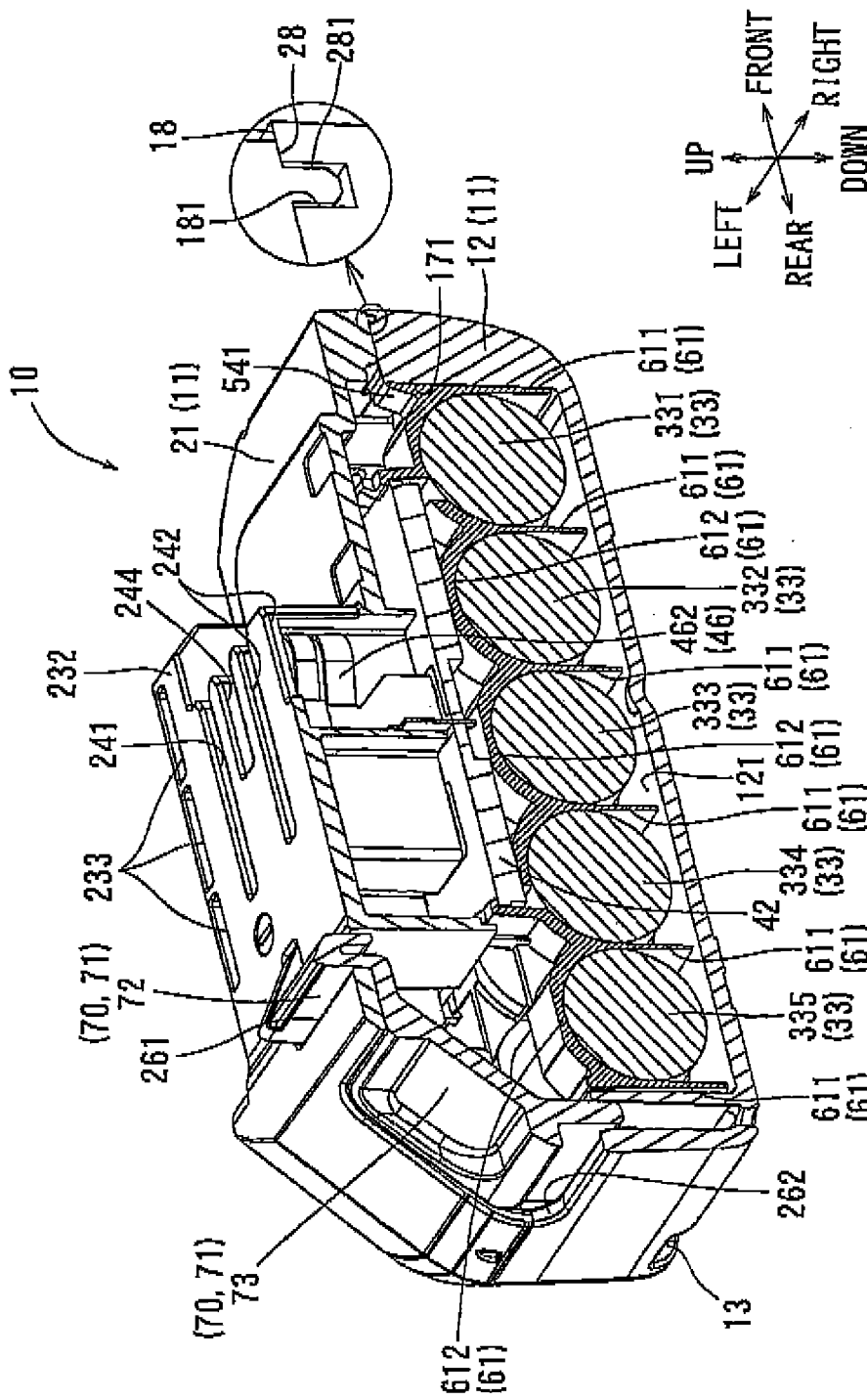
FIG. 9 is a cross-sectional perspective view perspectively showing the cross-section of the battery pack of FIG. 8.
Figure 10:
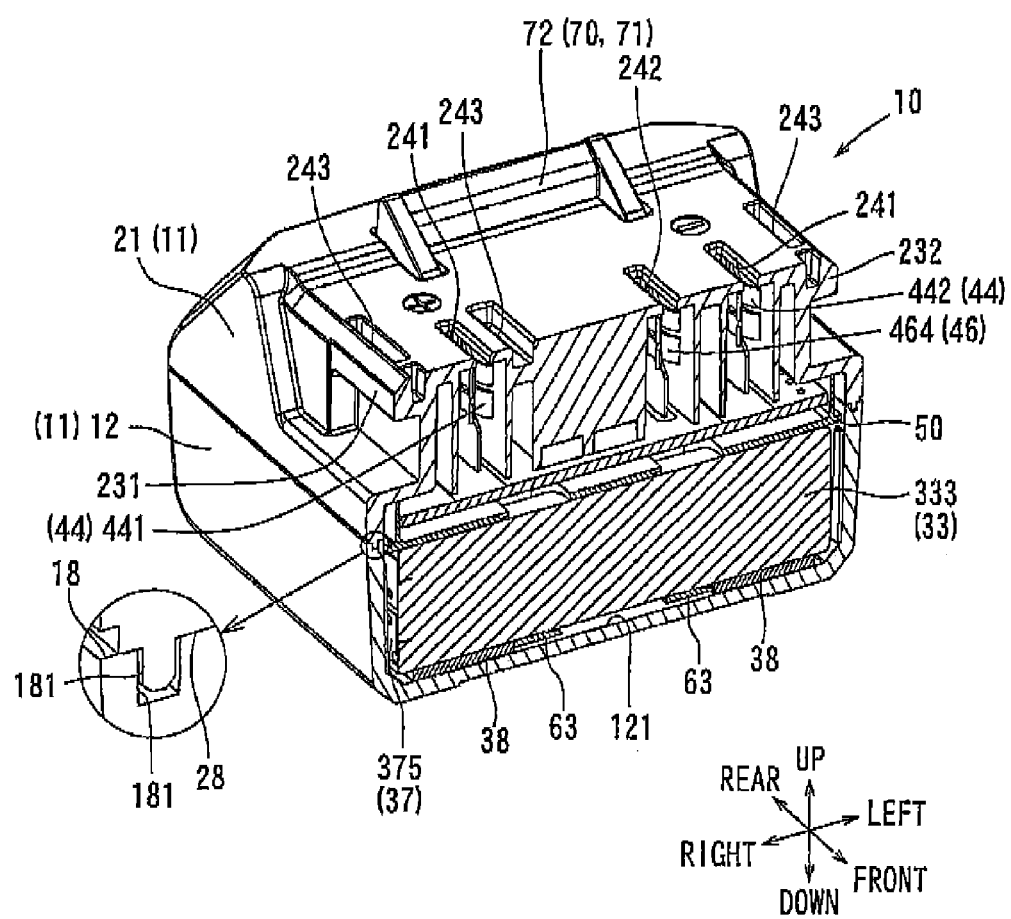
FIG. 10 is a cross-sectional perspective view showing the cross-section of the battery pack of FIG. 9 laterally extending from the center in the left and right directions.
Figure 11:
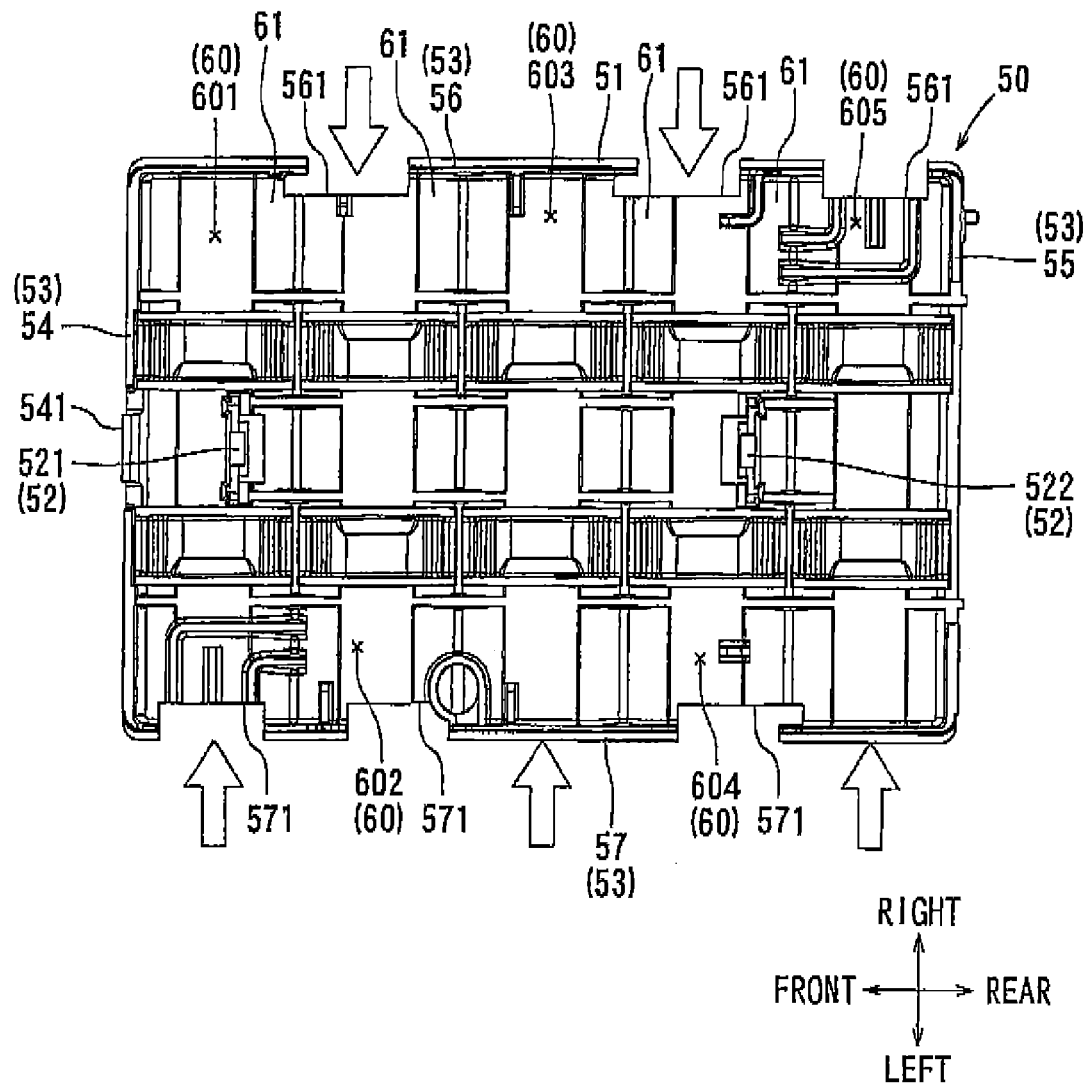
FIG. 11 is a top view of a cell holder of the first embodiment.
Figure 12:
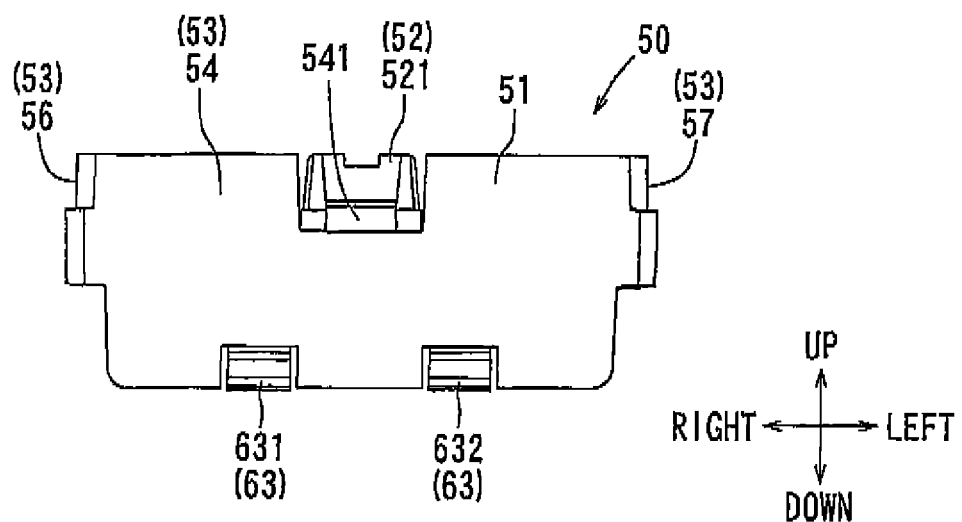
FIG. 12 is a front view of the cell holder of FIG. 11.
Figure 13:
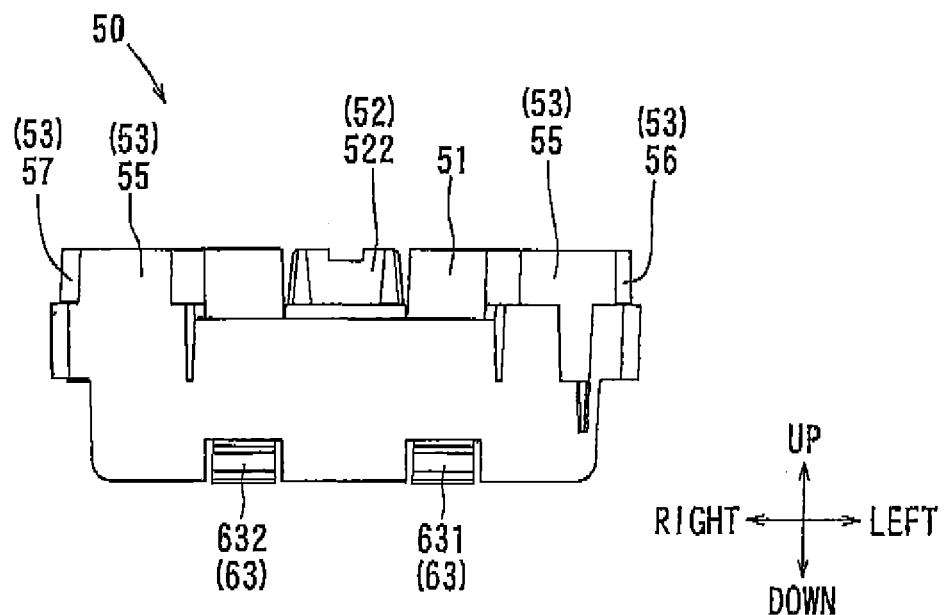
FIG. 13 is a rear view of the cell holder of FIG. 11.
Figure 14:
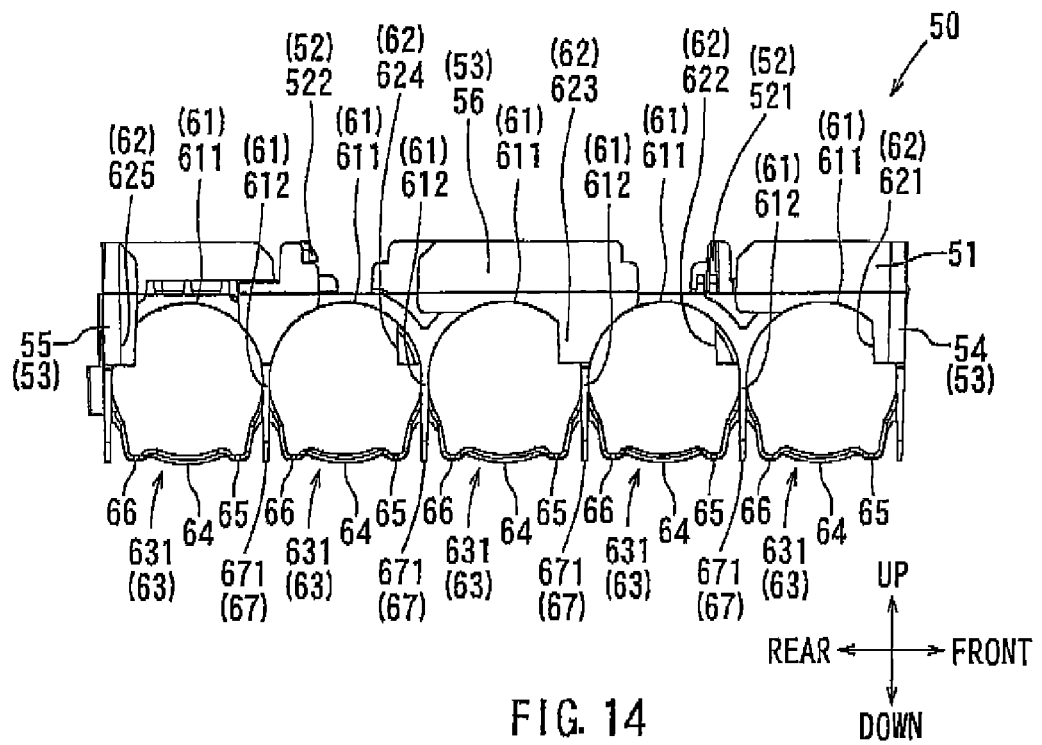
FIG. 14 is a right side view of the cell holder of FIG. 11.
Figure 15:
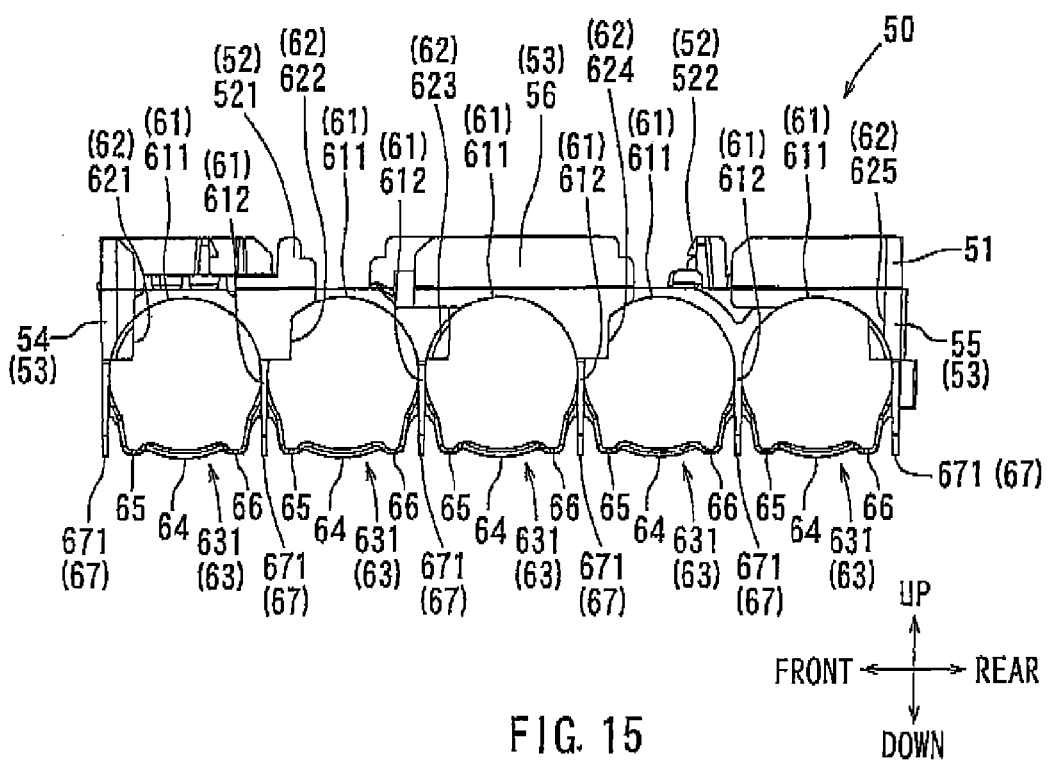
FIG. 15 is a left side view of the cell holder of FIG. 11.
Figure 16:
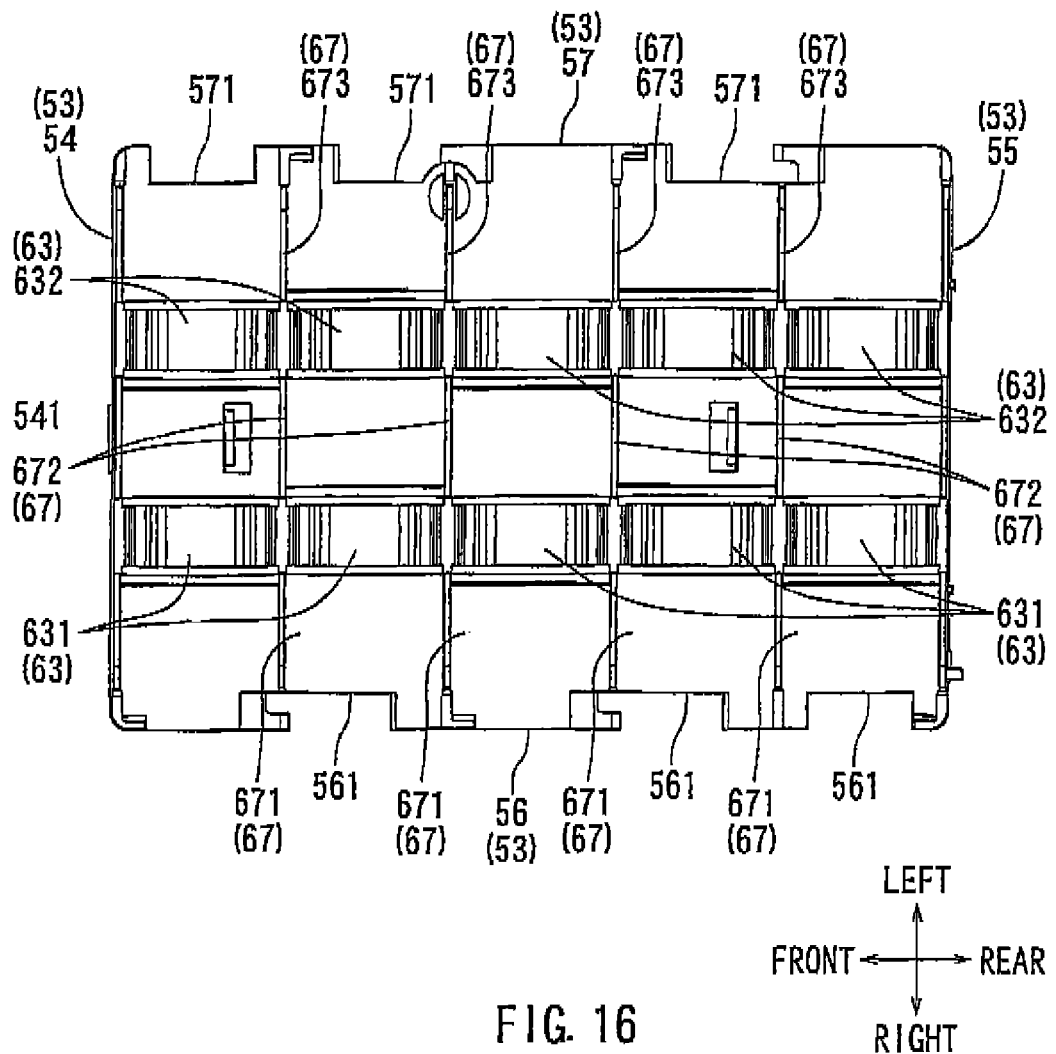
FIG. 16 is a bottom view of the cell holder of FIG. 11.
Figure 17:
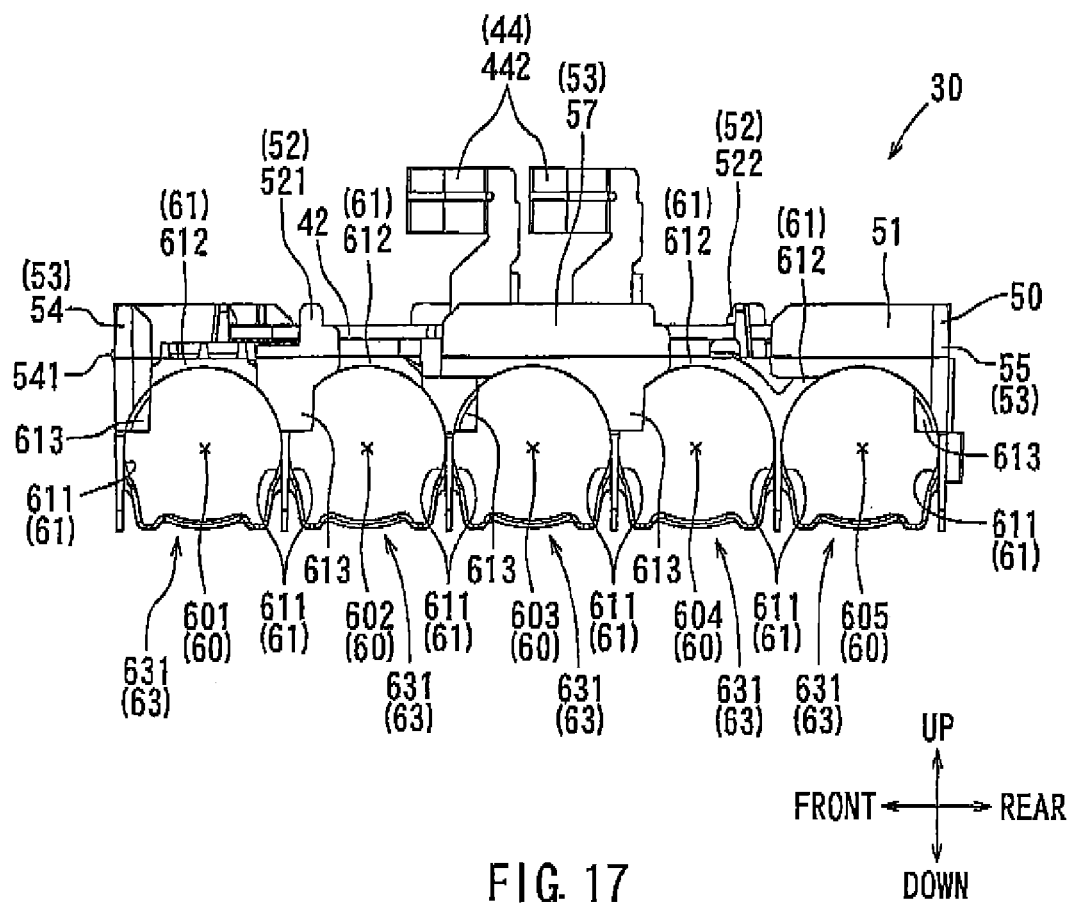
FIG. 17 is a side view of the cell holder of FIG. 11 on which a circuit board is mounted.
Figure 18:
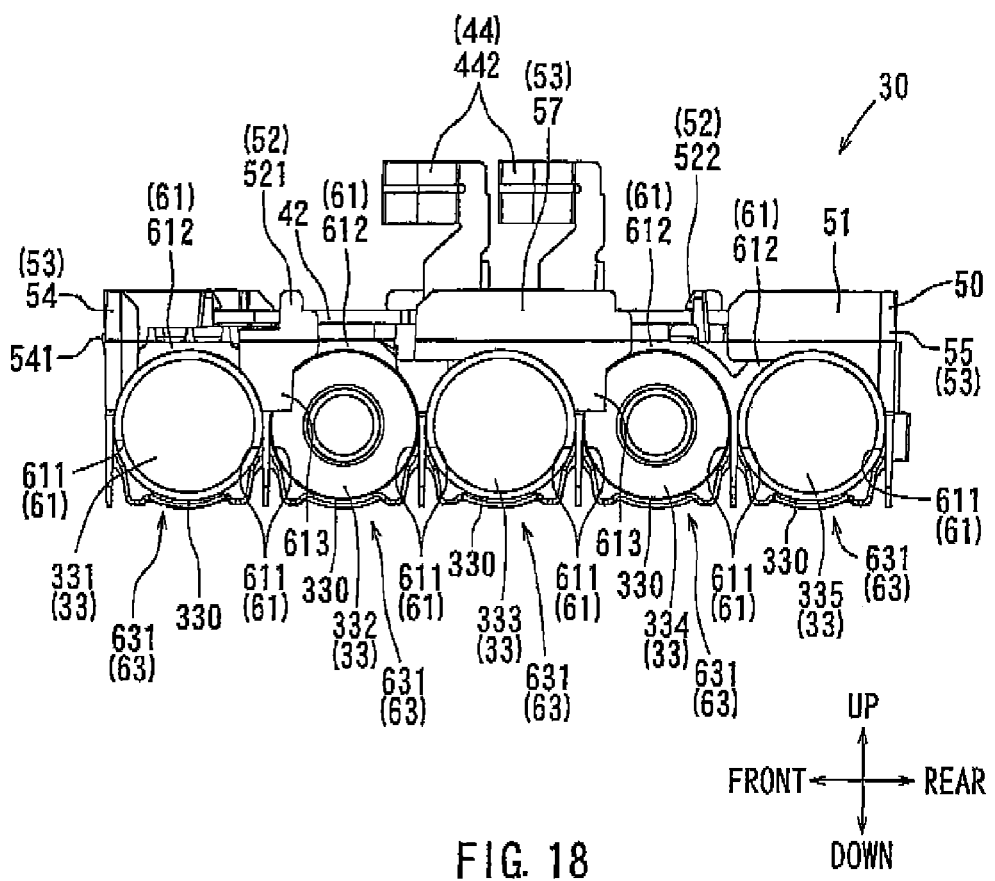
FIG. 18 is a side view showing that battery cells are inserted into the cell holder of FIG. 17.
Figure 19:
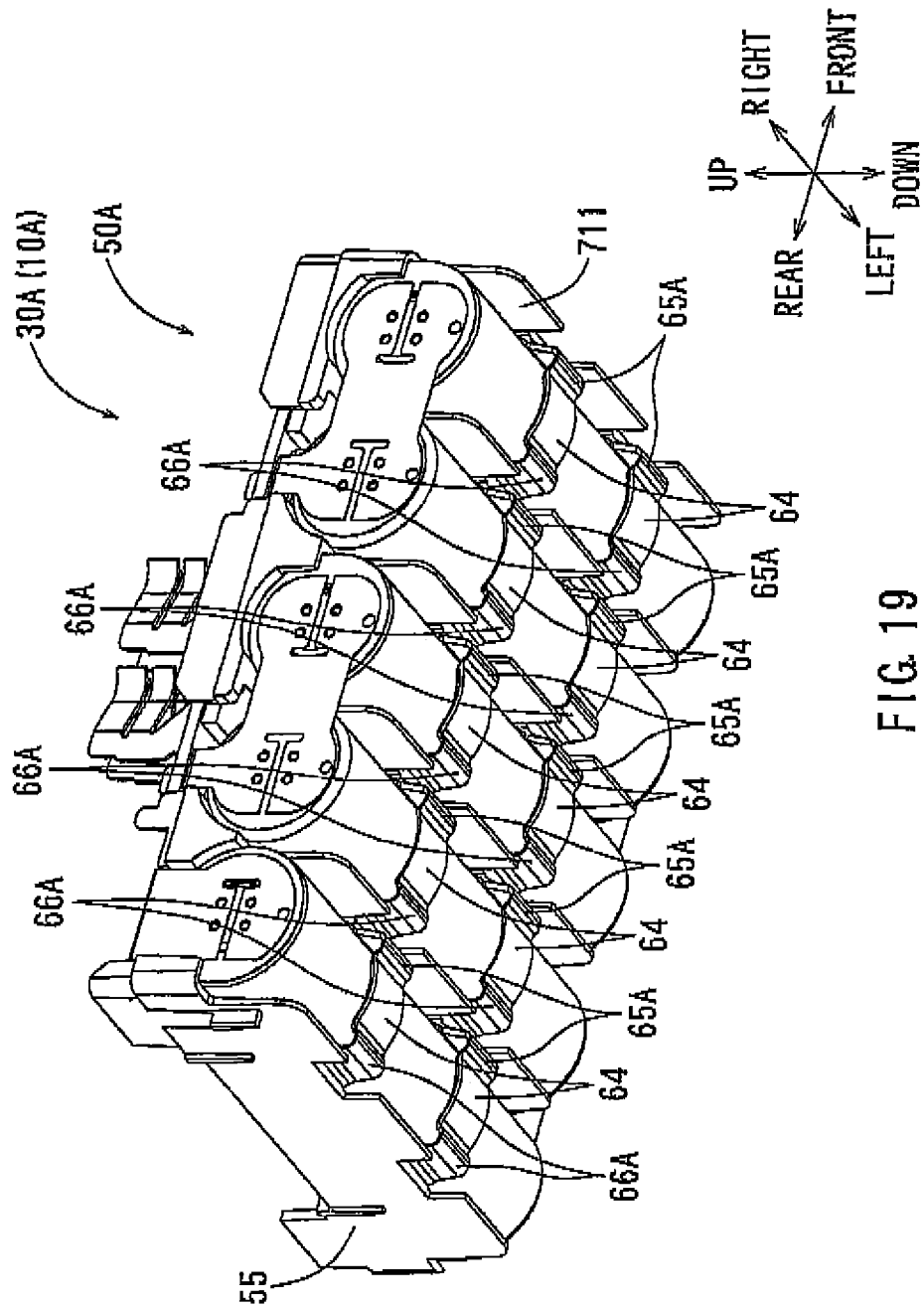
FIG. 19 is a perspective view perspectively showing the lower side of a battery body of a second embodiment.
Figure 20:
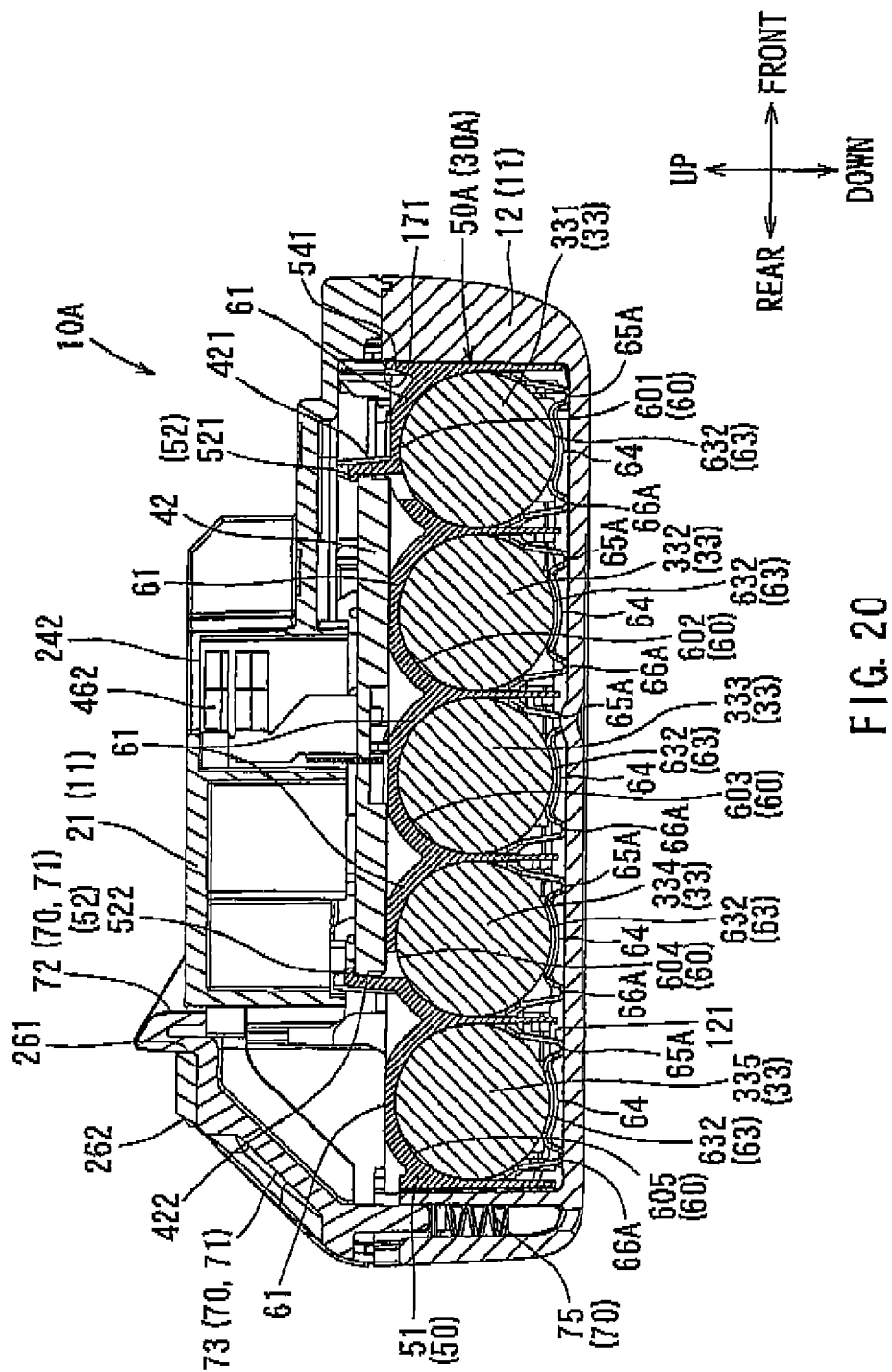
FIG. 20 is a cross-sectional view showing the cross-section of a battery pack according to the second embodiment extending from the center in the front and rear directions.
Figure 21:
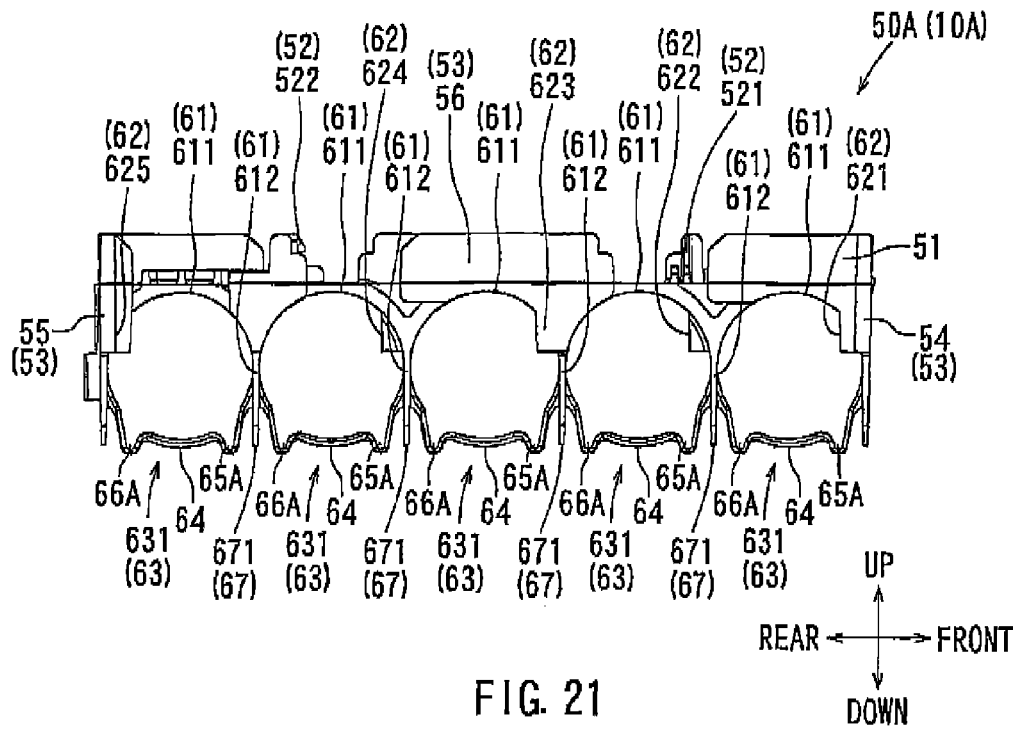
FIG. 21 is a right side view of a cell holder of the FIG. 19.
Figure 22:
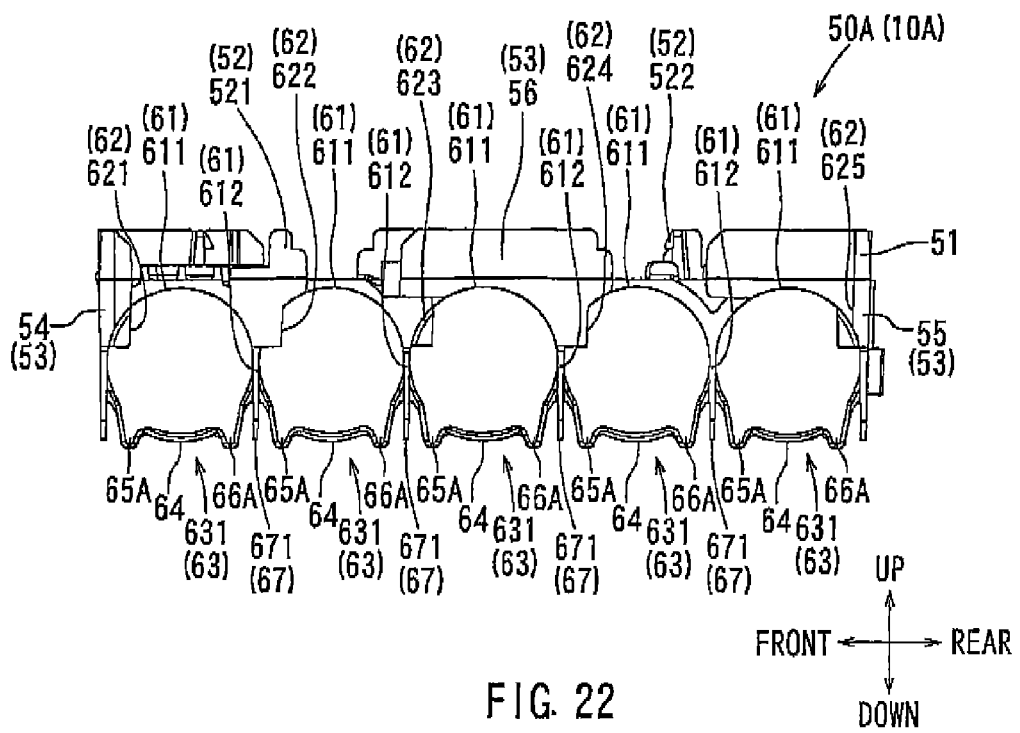
FIG. 22 is a left side view of the cell holder of FIG. 19.
Figure 23:
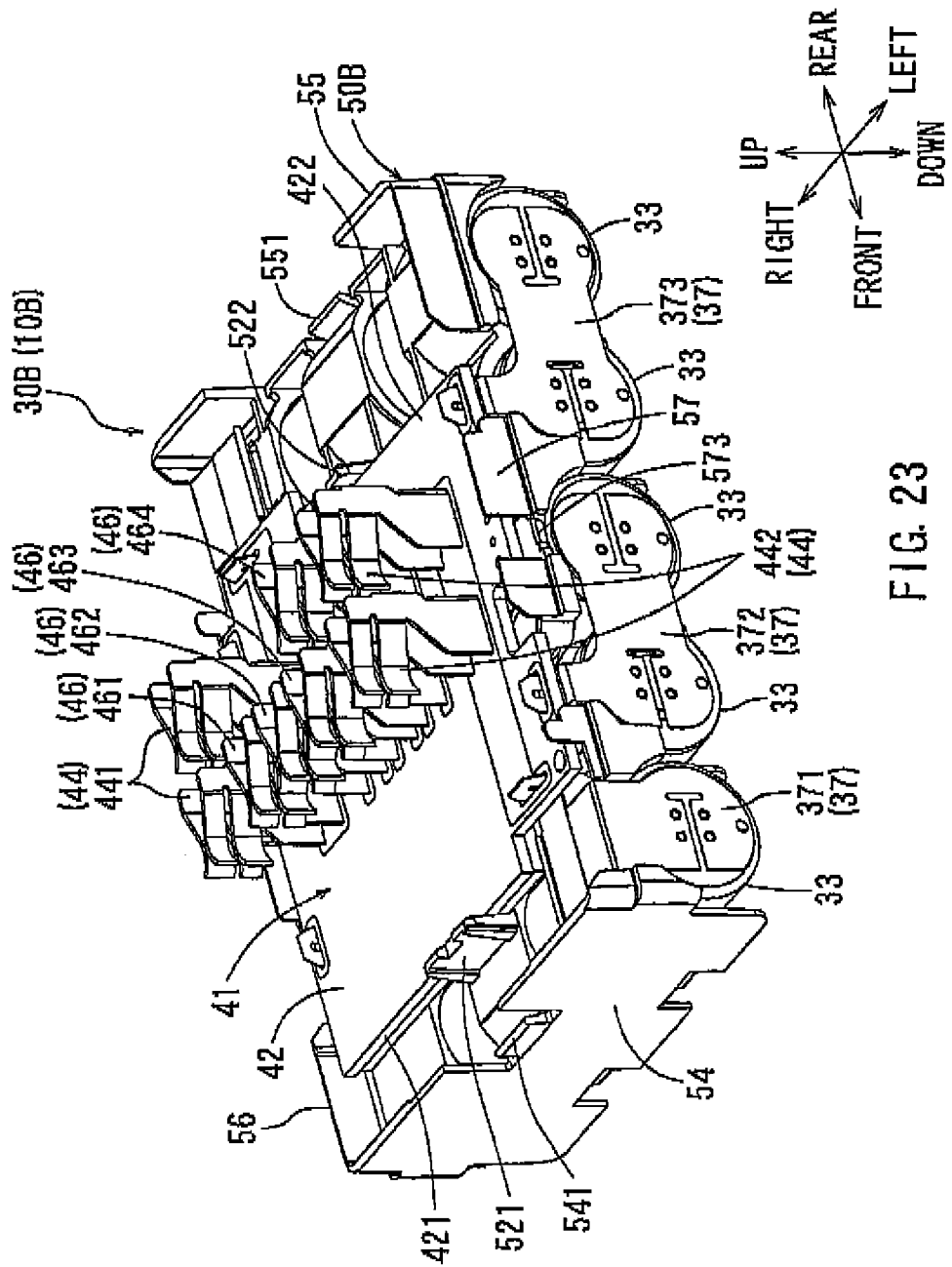
FIG. 23 is a perspective view perspectively showing the upper side of a battery body of a third embodiment.
Figure 24:
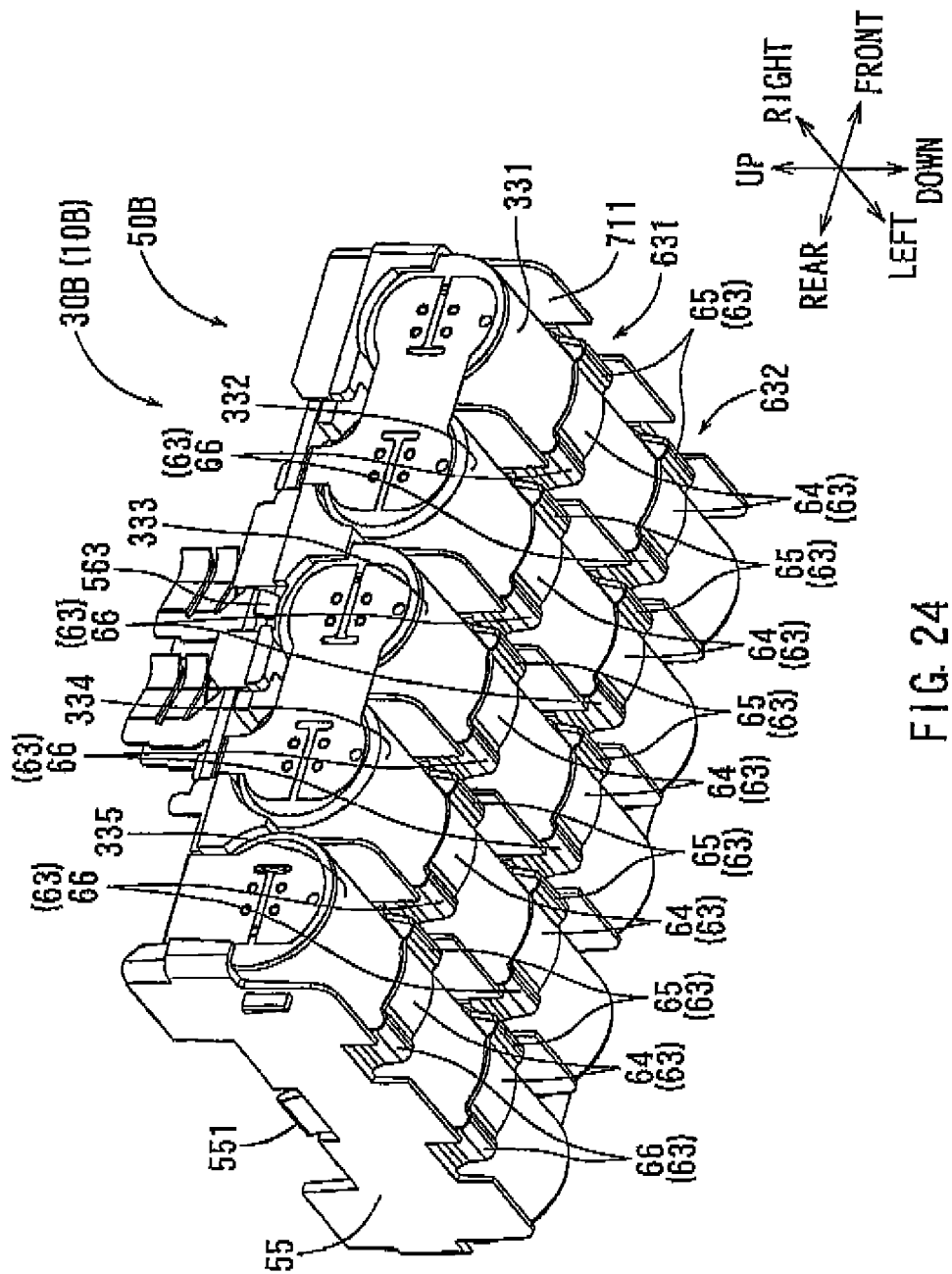
FIG. 24 is a perspective view perspectively showing the lower side of the battery body of FIG. 23.
Figure 25:
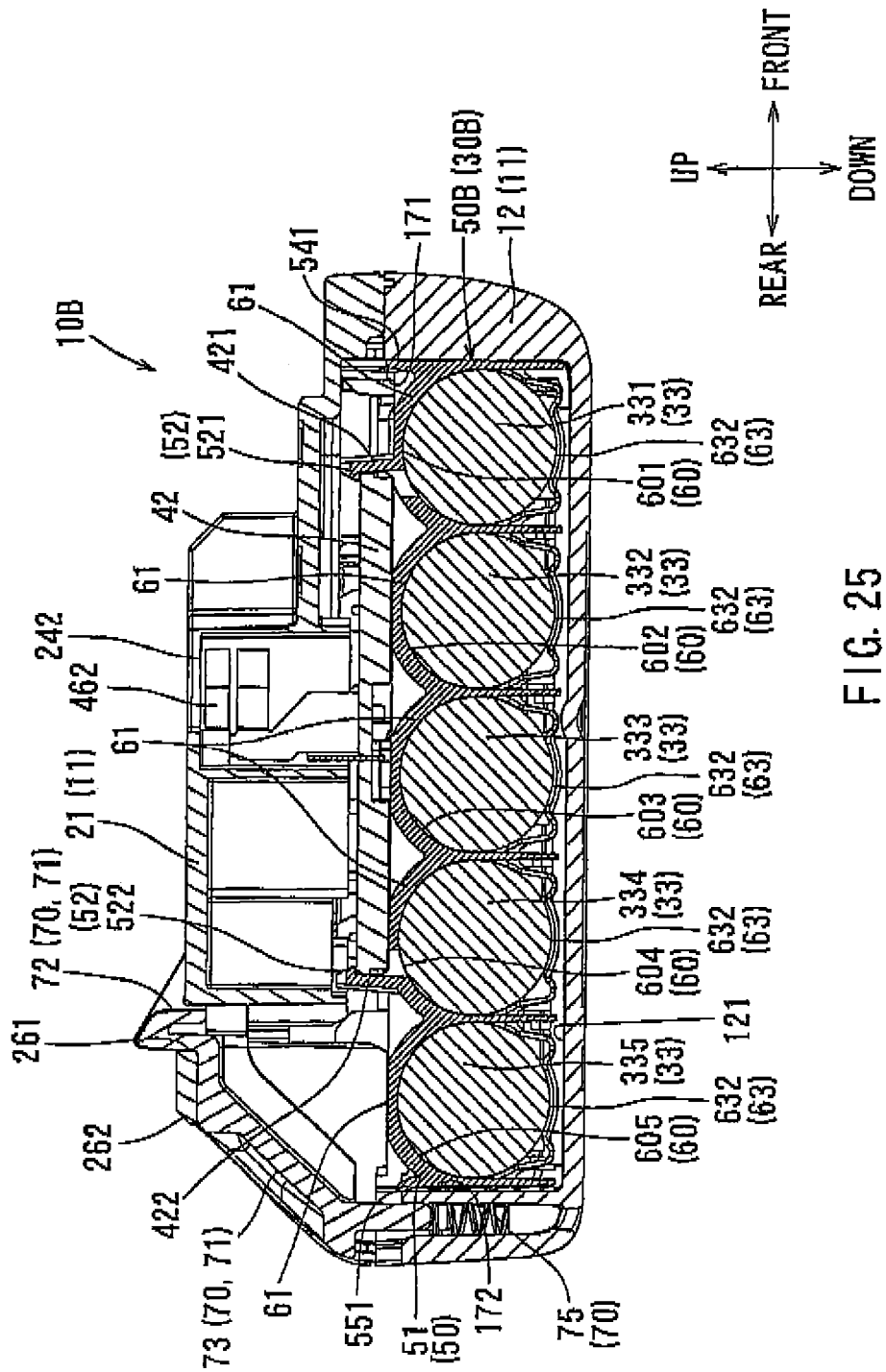
FIG. 25 is a cross-sectional view showing the cross-section of a battery pack according to the third embodiment extending from the center in the front and rear directions.
Figure 26:
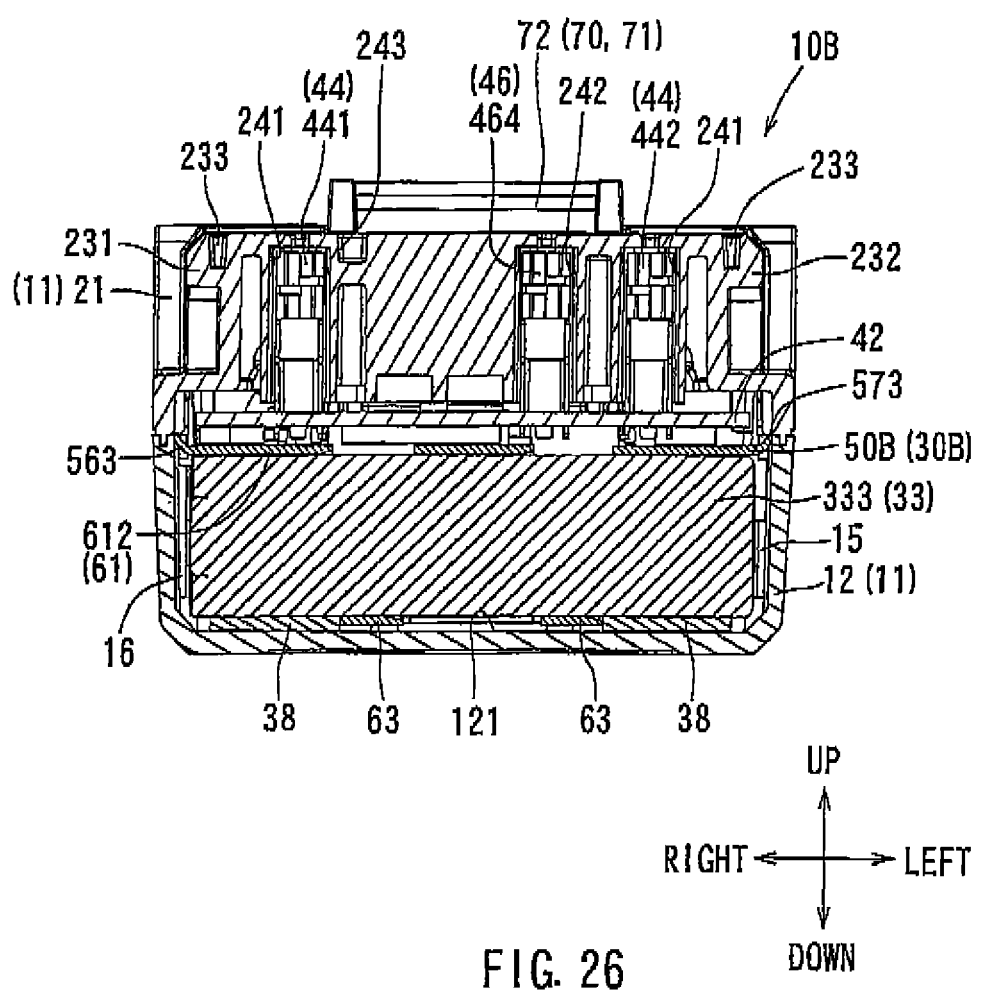
FIG. 26 is a cross-sectional view showing the cross-section of the battery pack according to the third embodiment laterally extending from the center in the left and right directions.
Figure 27:
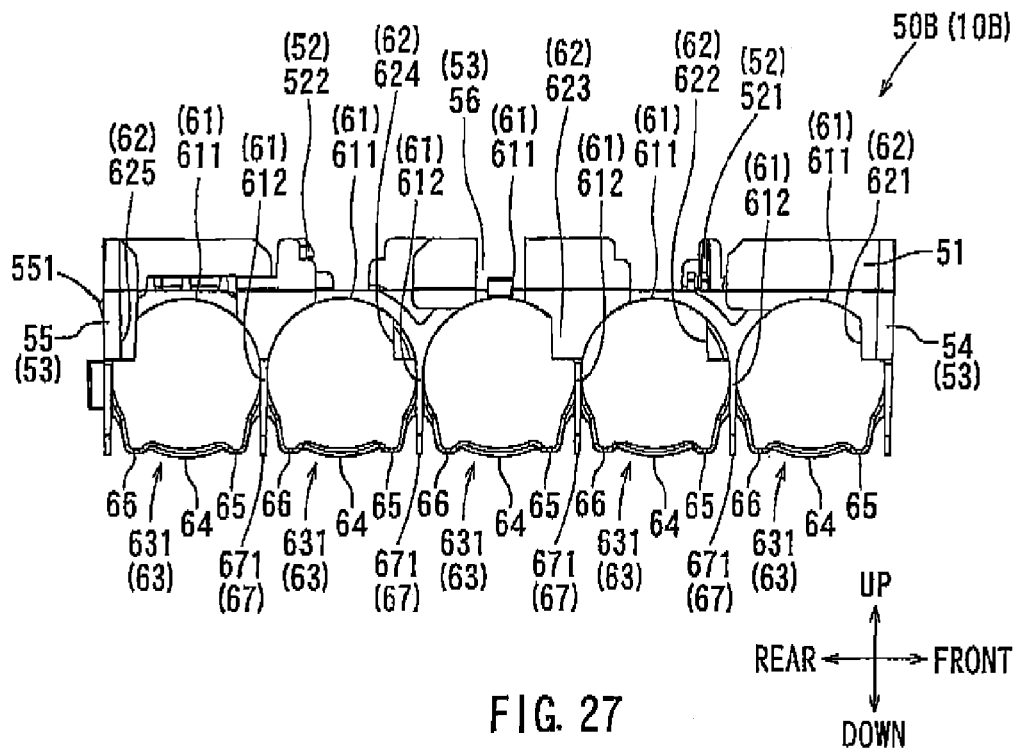
FIG. 27 is a right side view of a cell holder of FIG. 23.
Figure 28:
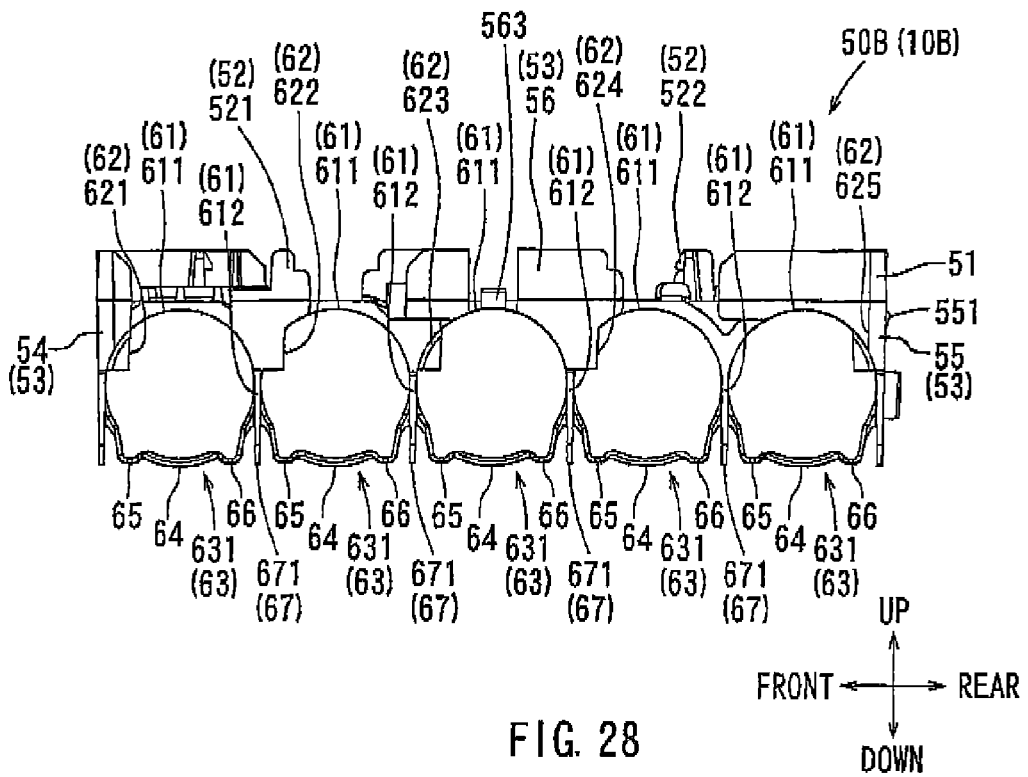
FIG. 28 is a left side view of the cell holder of FIG. 23.
Figure 29:
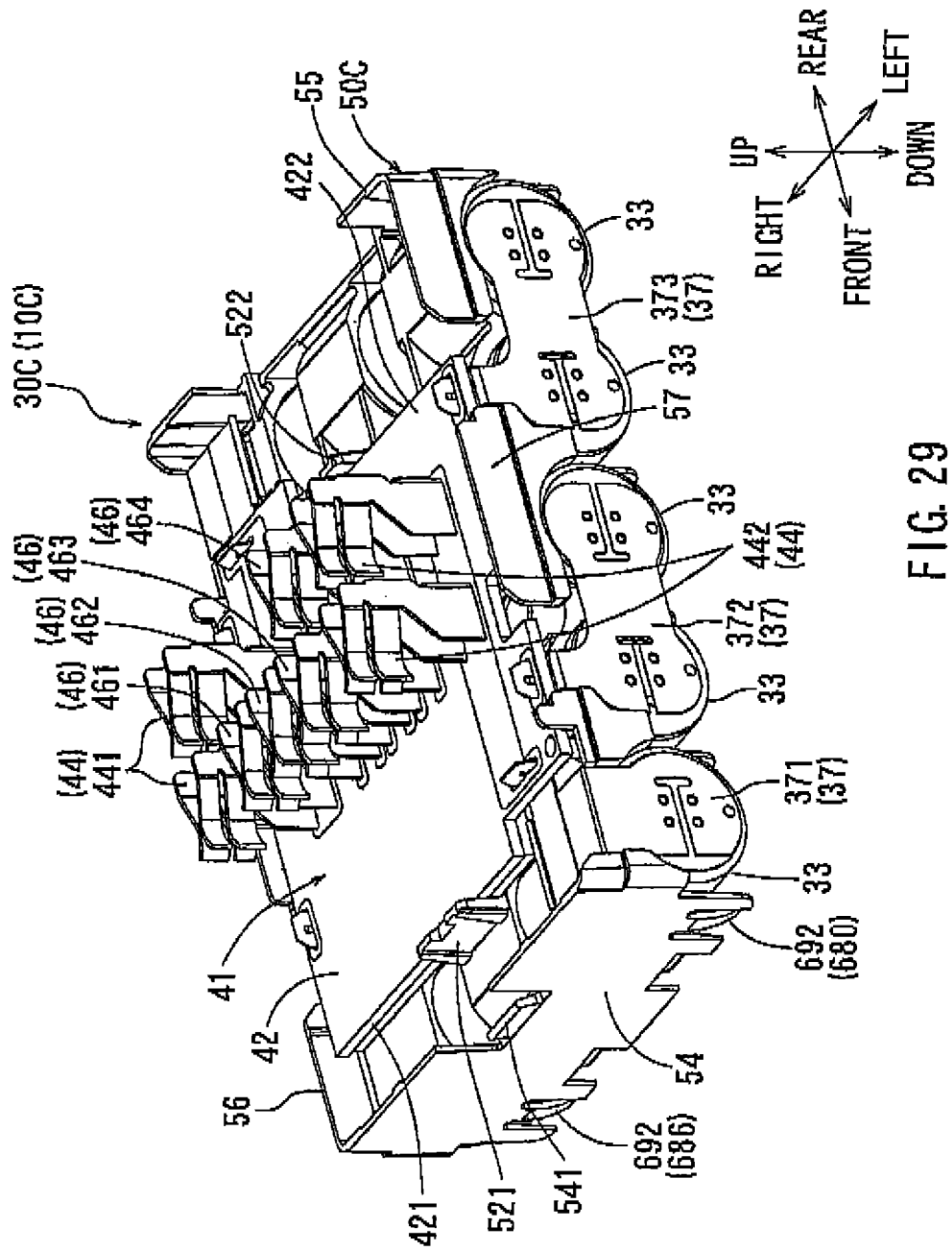
FIG. 29 is a perspective view perspectively showing the upper side of a battery body of a fourth embodiment.
Figure 30:
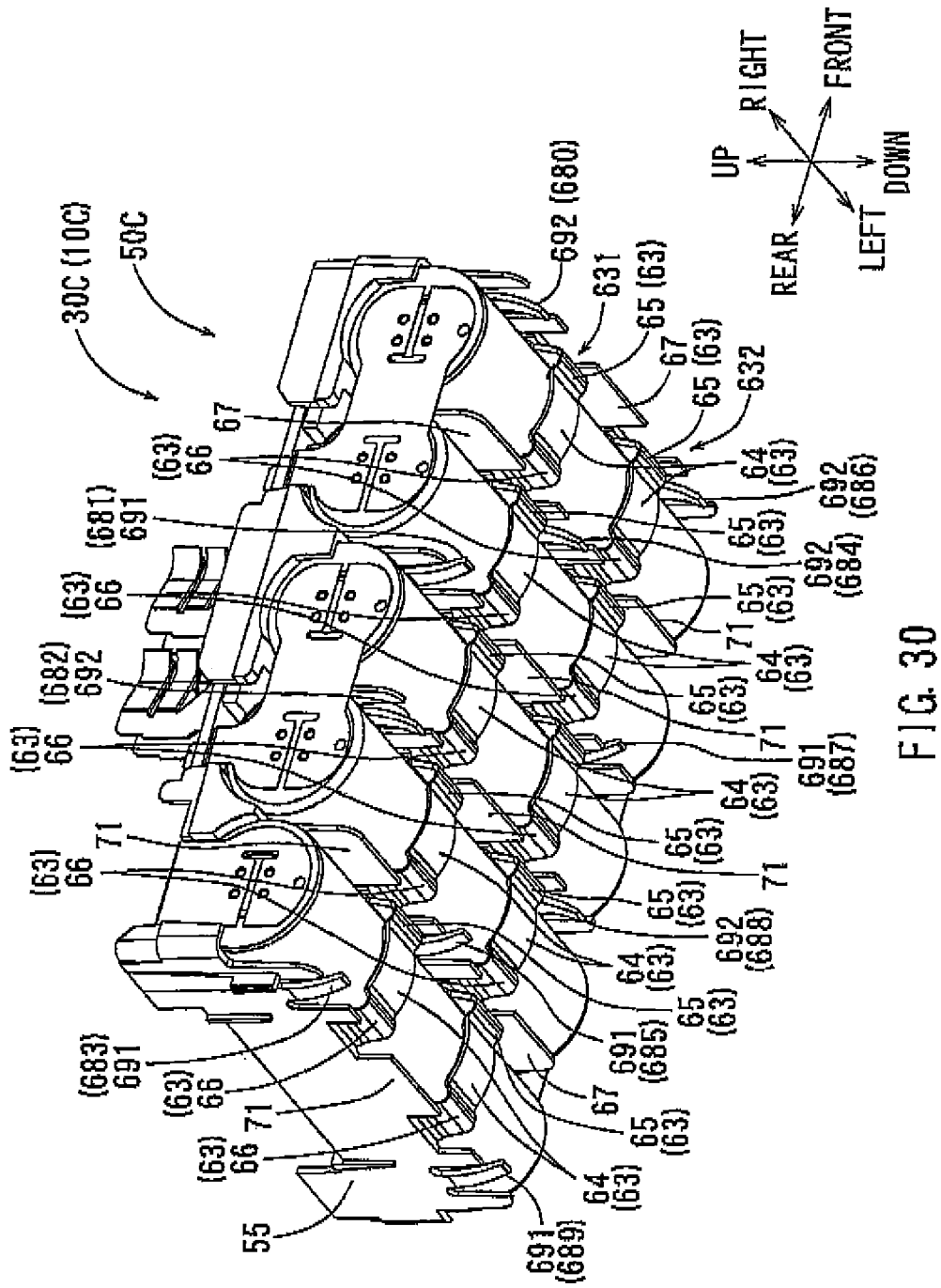
FIG. 30 is a perspective view perspectively showing the lower side of the battery body of FIG. 29.
Figure 31:
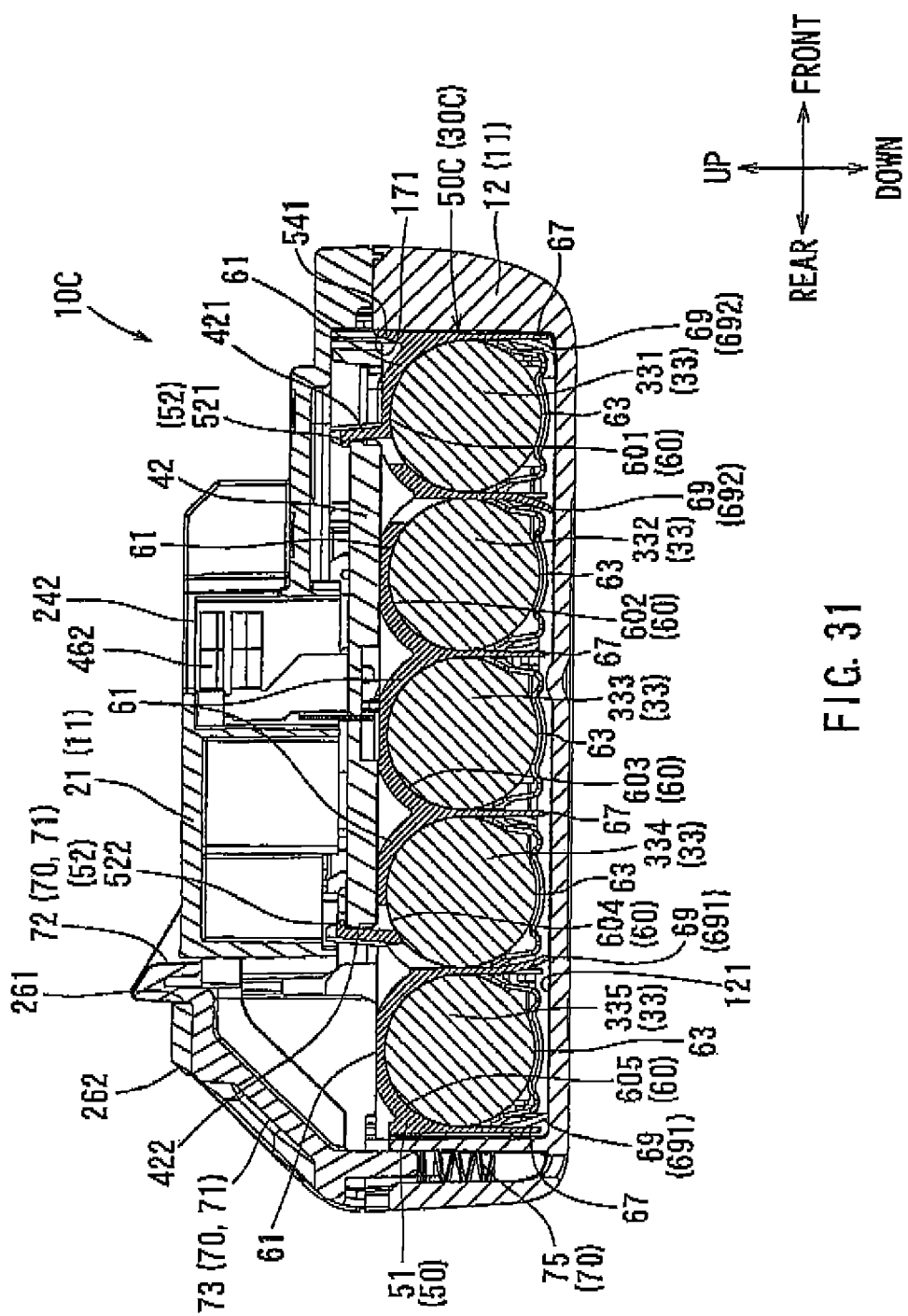
FIG. 31 is a cross-sectional view showing the cross-section of a battery pack according to the fourth embodiment that extending from the center in the front and rear directions.
Figure 32:
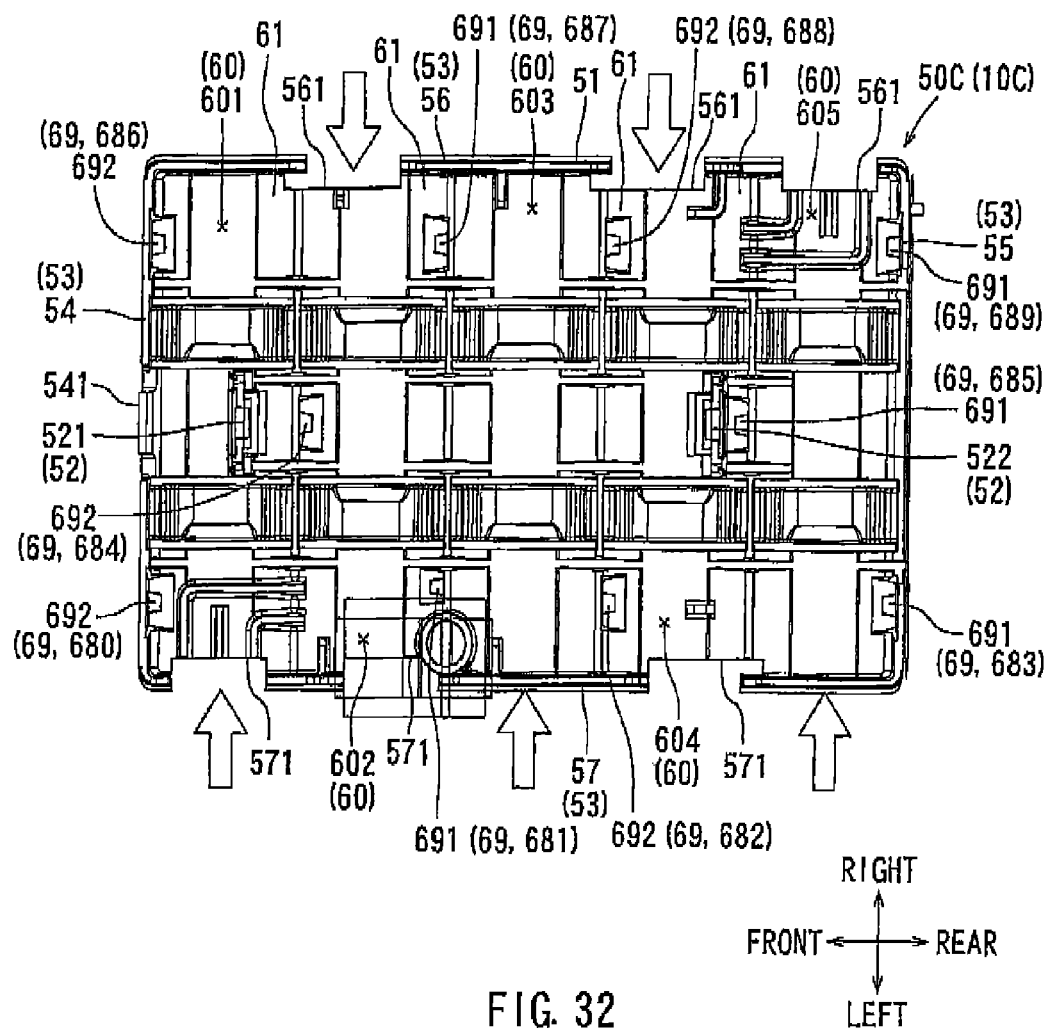
FIG. 32 is a top view of a cell holder of FIG. 29.
Figure 33:
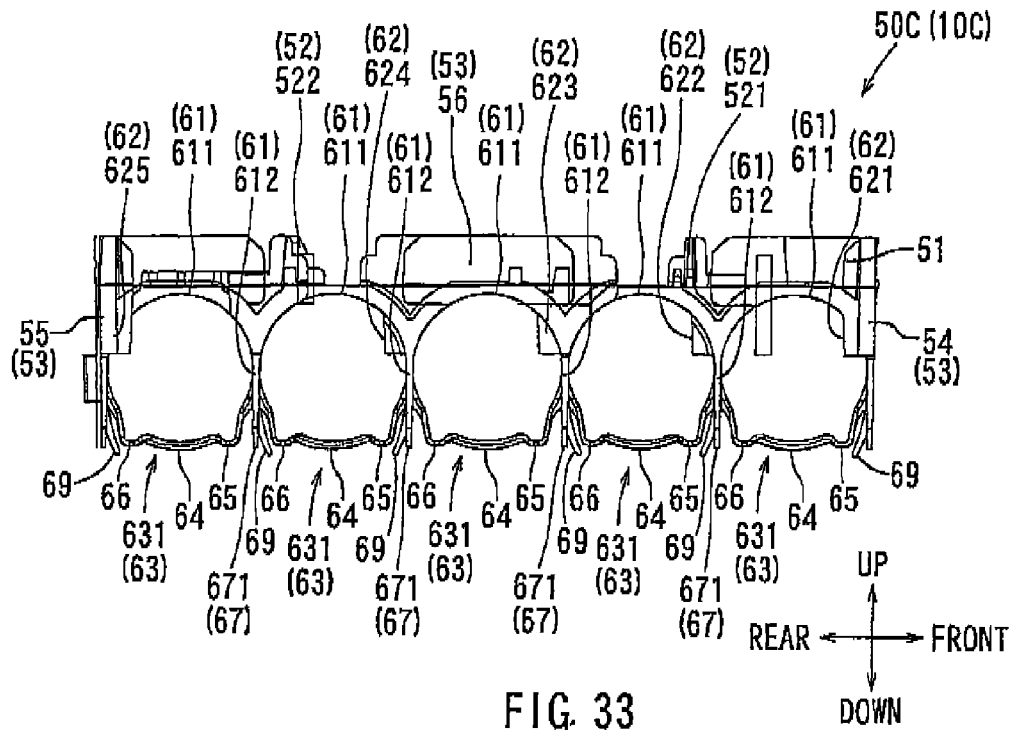
FIG. 33 is a right side view of the cell holder of FIG. 29.
Figure 34:
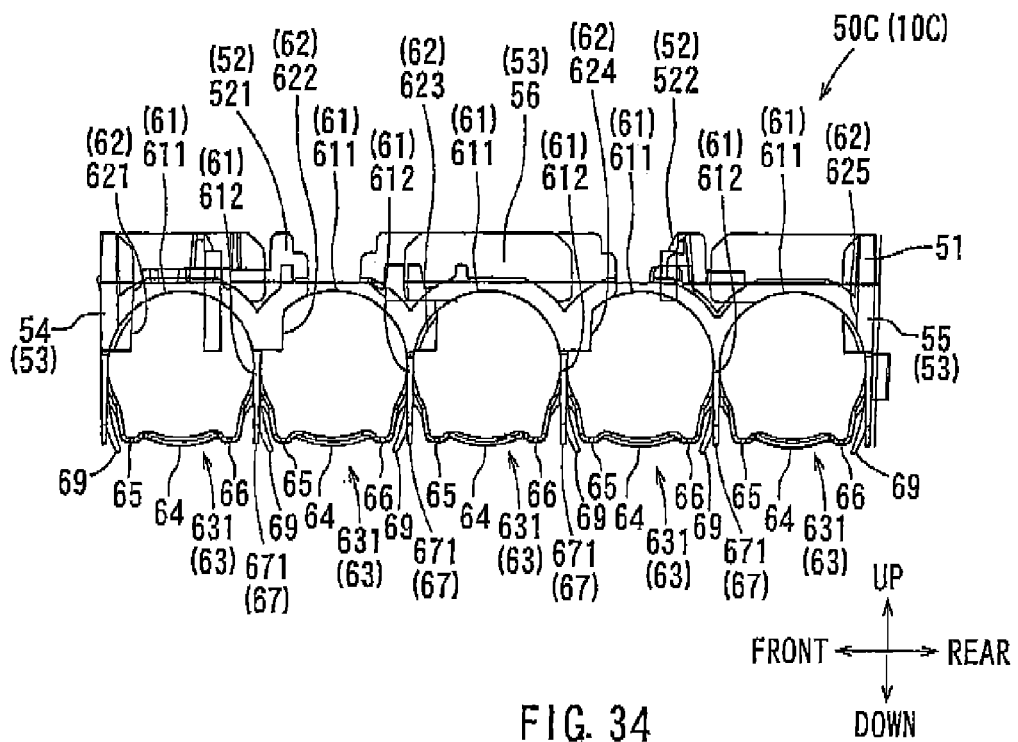
FIG. 34 is a left side view of the cell holder of FIG. 29.

The outer rim body 51 has a structure that is supported by the case 11 and that supports the cell receiving portions 60. That is, the outer rim body 51 includes a board combining portion 52 and an inner surface contact portion 53. The board combining portion 52 functions as a portion at which the cell holder 50 is locked to the circuit board 42. Specifically, the board combining portion 52 includes two hooks, that is, a front looking hook 521 and a rear locking hook 522 that are locked to the above-mentioned circuit board 42. These two front and rear locking hooks 521 and 522 are formed integrally with the outer rim body 51 so as to protrude upward from side surface receiving-partitioning portions 611 which extend toward the middle from the outer rim body 51. These two front and rear locking hooks 521 and 522 are provided at positions that can be displaced forward and rearward on the center axis of the cell holder 50 in the left-and-right direction. Specifically, the front locking hook 521 is provided on the front side on the center axis of the cell holder 50 in the left-and-right direction, and the rear locking hook 522 is provided on the rear side on the center axis of the cell holder 50 in the left-and-right direction. The front locking hook 521 is engagingly locked to a front edge 421 of the circuit board 42 so as to protrude upwards as shown in FIG. 8. The locked front locking hook 521 pinches the circuit board 42 between itself and upper surface receiving-partitioning portions 612 of the cell receiving portions 60 described below. Further, the rear locking hook 522 is locked to a rear edge 422 of the circuit board 42 from above, and the locked rear locking hook 522 pinches the circuit board 42 between itself and the upper surface receiving-partitioning portions 612 of the cell receiving portions 60 described below. In this way, the board combining portion 52, which includes the front and rear locking hooks 521 and 522, combines the cell holder 50 with the circuit board 42 so that the cell holder 50 is integrally coupled to the circuit board 42. Since the cell holder 50 and the circuit board 42 are combined in this way by the board combining portion 52 so as to be integrally coupled with each other, screw members such as bolts for retaining the cell holder 50 and the circuit board 42 do not need to be used. Accordingly, excellent productivity is obtained. Further, since the cell holder 50 and the circuit board 42 are held together by the board combining portion 52, ease in the manufacturing process can also be improved.

The inner surface contact portion 53 has the same general shape as the outer edge of the cell holder 50. This inner surface contact portion 53 comes into contact with the inner surface of the lower case 12. That is, the inner surface contact portion 53 includes a front wall portion 54, a rear wall portion 55, a right wall portion 56, and a left wall portion 57. The front wall portion 54 has the shape of an outer surface that can come into surface contact with a front inner surface 171 of the lower case 12. The front wall portion 54 has the shape of an outer surface that can come into surface contact with the front inner surface 171 of the lower case 12 shown in FIG. 6. The rear wall portion 55 has the shape of an outer surface that can come into surface contact with a rear inner surface 172 of the lower case 12 shown in FIG. 6.

Further, the right wall portion 56 has the shape of an outer surface that can come into surface contact with a right inner surface 173 of the lower case 12 shown in FIG. 6. The gap portions 561 are formed on the right wall portion 56, and the support ribs 15 formed at the above-mentioned lower case 12 are fitted to the gap portions 561. Furthermore, the left wall portion 57 has the shape of an outer surface that can come into surface contact with a left inner surface 174 of the lower case 12 shown in FIG. 6. The gap portions 571 are also formed on the left wall portion 57, and the support ribs 15 formed at the above-mentioned lower case 12 are fitted to the gap portions 571. In this way, the relative movement of the cell holder 50 in the lower case 12 in the front-and-rear direction is restricted by the contact of the front and rear wall portions 54 and 55 so that the cell holder 50 is supported by the lower case 12. In addition, the relative movement of the cell holder 50 in the lower case 12 in the front-and-rear direction is restricted by the contact of the support ribs 15 fitted to the gap portions 561 and 571 and by the contact of the pressure ribs 16 pressing the lead plates 37 toward the battery cells 33. In this way, the cell holder 50 is supported by the lower case 12.

Further, the receiving-partitioning portions 61 of the cell receiving portions 60 described below come into contact with the circuit board 42 from below, so that the upward movement of the cell holder 50 relative to the case 11 is restricted. Furthermore, the battery cells 33 housed in the cell receiving portions 60 described below are pressed against the cushioning mats 38, so that the downward movement of the cell holder 50 relative to the case 11 is restricted.

A front pressing rib 541, which has a small width in the left-and-right direction (width direction), is formed near the middle of the front wall portion 54 of the above-mentioned cell holder 50 in the left-and-right direction (width direction). The front pressing rib 541 corresponds to a dimensional difference interposition member. That is, the front pressing rib 541 is a portion that comes into contact with the front inner surface 171. It generates a pressing force against the front inner surface 171 of the lower case 12 when the cell holder 50 is assembled in the lower case 12.

Specifically, the front pressing rib 541 is formed to come into contact with the front inner surface 171 of the lower case 12 before the cell holder 50 is assembled in the lower case 12 so that a dimensional difference between the inside of the lower case 12 and the front wall portion 54 of the cell holder 50 is bridged. That is, when the cell holder 50 is assembled in the lower case 12, a dimensional difference between the inside of the lower case 12 and the front wall portion 54 of the cell holder 50 is completely bridged. In this case, the front pressing rib 541 generates a satisfactory pressing force against the front inner surface 171 of the lower case 12 by coming into contact with the front inner surface 171 of the lower case 12. Meanwhile, the front pressing rib 541 is molded integrally with the cell holder 50 so as to be integrated with the front wall portion 54. Specifically, the front pressing rib 541 is formed so as to be inclined forward while protruding upward. Further, a portion at which the front pressing rib 541 is provided is situated at a middle portion of the front inner surface 171 of the above-mentioned lower case 12 in the left-and-right direction (width direction) and faces the upper end of the front inner surface 171. For this reason, the front pressing rib 541 is provided at an edge of the base end (base end edge) of the cell holder 50 in an assembling direction when the cell holder 50 is assembled into the lower case 12. Meanwhile, when the cell holder 50 is assembled into the lower case 12, an upper edge of the front pressing rib 541 is set so as to be aligned with the upper edge of the front inner surface 171 of the lower case 12 facing the cell holder. The front pressing rib 541, which is set as described above, is formed only at the front end of the cell holder that is one end in a direction orthogonal to the direction of the extension axis of the above-mentioned battery cell 33.

Next, the cell receiving portions 60, which are provided at the cell holder 50, will be described. The cell receiving portions 60 are portions of the cell holder 50 that receive the battery cells 33. The cell receiving portions 60 include the receiving-partitioning portions 61 that partition a hollow structure for receiving the battery cells 33 and the cell holding portions 63 that hold the housed battery cells 33. The receiving-partitioning portions 61 are provided so as to partition the hollow structure into first to fifth cell receiving portions 601 to 605 that are arranged side by side in the front-and-rear direction. The receiving-partitioning portions 61 are formed by connecting the side surface receiving-partitioning portions 611 with the upper surface receiving-partitioning portions 612. The side surface receiving-partitioning portions 611 and the upper surface receiving-partitioning portions 612 are formed in the shape of partition walls extending in the left-and-right direction, and partition off the first to fifth cell receiving portions 601 to 605 that are arranged side by side in the front-and-rear direction. Specifically, the side surface receiving-partitioning portions 611 are formed in the shape of partition walls that are provided so as to partition off a space in the front-and-rear direction. Further, the upper surface receiving-partitioning portions 612 are formed in the shape of partition walls that are provided so as to partition off a space in the up-and-down direction. The side surface receiving-partitioning portions 611 and the upper surface receiving-partitioning portions 612, as described above, partition off the cell holder 50 into first to fifth cell receiving portions 601 to 605. The side surface receiving-partitioning portions 611 and the upper surface receiving-partitioning portions 612, as described above, correspond to guide portions of the invention. That is, the side surface receiving-partitioning portions 611 and the upper surface receiving-partitioning portion 612 are formed so as to have a substantially C shaped-curved surface which function to guide the first to fifth battery cells 331 to 335 into the first to fifth cell receiving portions 601 to 605 of the cell holder 50.

Both left and right sides of the first to fifth cell receiving portions 601 to 605, which are formed so as to be partitioned off as described above, are configured to be open. The opening shape of the first to fifth cell receiving portions 601 to 605 are configured such that the battery cell 33 can be inserted into each of these first to fifth cell receiving portions 601 to 605 through only one of the left and right sides as shown by void arrows of FIG. 11. That is, opening/closing portions 62, which restrict the insertion of the battery cells 33 by closing the opened sides, are provided at the opposite sides of both left and right sides of these first to fifth cell receiving portions 601 to 605. The opening/closing/portions 62 are configured to be a first opening/closing portion 621, a second opening/closing portion 622, a third opening/closing portion 623, a fourth opening/closing portion 624, and a fifth opening/closing portion 625. That is, the first opening/closing portion 621 protrudes from the right wall portion 56 so as to close a part of the right opened side of the first cell receiving portion 601. For this reason, when the battery cell 33 is to be housed in the first cell receiving portion 601, the battery cell 33 can be inserted and housed in the first cell receiving portions 601 only from the left side. Further, the second opening/closing portion 622 protrudes from the left wall portion 57 so as to close a part of the left opened side of the second cell receiving portions 602. For this reason, when the battery cell 33 is to be housed in the second cell receiving portion 602, the battery cell 33 can be inserted and housed in the second cell receiving portion 602 only from the right side.

Furthermore, the third opening/closing portion 623 protrudes from the right wall portion 56 so as to close a part of the right opened side of the third cell receiving portion 603. For this reason, when the battery cell 33 is to be housed in the third cell receiving portion 603, the battery cell 33 can be inserted and housed in the third cell receiving portion 603 only from the left side. Moreover, the fourth opening/closing portion 624 protrudes from the left wall portion 57 so as to close a part of the left opened side of the fourth cell receiving portion 604. For this reason, when the battery cell 33 is to be housed in the fourth cell receiving portion 604, the battery cell 33 can be inserted and housed in the fourth cell receiving portion 604 only from the right side. Further, the fifth opening/closing portion 625 protrudes from the right wall portion 56 so as to close a part of the right opened side of the fifth cell, receiving portion 605. For this reason, when the battery cell 33 is to be housed in the fifth cell receiving portions 605, the battery cell 33 can be inserted and housed in the fifth cell receiving portions 605 only from the left side. When the battery cells 33 are to be housed in the first to fifth cell receiving portions 601 to 605 in this way, the battery cells 33 are alternately inserted into the left and right sides of the cell receiving portions. That is, the first opening/closing portions 621 to fifth opening/closing portions 625 are configured such that the battery cell 33 can be inserted into each of the first to fifth cell receiving portions 601 to 605 only through the predetermined sides. Meanwhile, the insertion direction in which the battery cells 33 are inserted into these first to fifth cell receiving portions 601 to 605 is configured such that the positive electrode of the battery cell 33 is always positioned on the tip side in the insertion direction.

The cell holder 50 is provided with the cell holding portions 63 that come into contact with columnar outer peripheral surfaces 330 of the battery cells 33 so as to pinch the outer peripheral surfaces 330 and hold the battery cells 33. Two cell holding portions 63 are provided in each of the above-mentioned first to fifth cell receiving portions 601 to 605. The cell holding portions 63 are provided at positions which are symmetrical to each other with respect to the center axis of the cell holder 50 in the left-and-right direction. That is, the cell holding portions 63 are provided at positions that are symmetrical to each other in a longitudinal direction of the battery cell 33 with respect to the center of the battery cell 33. Specifically, right cell holding portions 631 are disposed on the right side of the center axis of the cell holder 50 in the left-and-right direction. Further, left cell holding portions 632 are disposed on the left side of the center axis of the cell holder 50 in the left-and-right direction.

The cell holding portions 63 hold the battery cells 33 so as to pinch the columnar outer peripheral surfaces 330 of the battery cells 33 by the above-mentioned receiving-partitioning portions 61 (the side surface receiving-partitioning portions 611 and the upper surface receiving-partitioning portions 612). In other words, the cell holding portions 63 come into contact with the columnar outer peripheral surfaces 330 so as to press the battery cells 33 against the receiving-partitioning portions 61 that form the substantially C shaped-curved surfaces of the above-mentioned cell receiving portions 60. In this case, the cell holding portions 63 act so as to press the battery cells 33 against the side surface receiving-partitioning portions 611 and the upper surface receiving-partitioning portions 612. A contact diameter, which is formed by the cell holding portion 63 and the receiving-partitioning portion 61, is configured to be smaller than the diameter of the columnar outer peripheral surface 330 of the battery cell 33. That is an inner diameter, which is formed by the cell holding portion 63 and the receiving-partitioning portion 61, is configured to be smaller than the peripheral diameter of the outer peripheral surface 330 of the battery cell 33. For this reason, the cell holding portion 63 and the receiving-partitioning portions 61 can pinch and hold the battery cell 33. Meanwhile, an inner diameter, which is formed by the cell holding portion 63 and the receiving-partitioning portion 61 (the side surface receiving-partitioning portions 611 and the upper surface receiving-partitioning portion 612), corresponds to a contact diameter of the invention.

The contact diameter of the cell holding portions 63 is configured so that they can increase when the battery cell 33 is held. Specifically, the cell holding portions 63 are formed so as to approach or be separated from the receiving-partitioning portions 61 (the side surface receiving-partitioning portions 611 and the upper surface receiving-partitioning portions 612). That is the cell holding portions 63 are formed so as to be elastically deformable. Accordingly, the cell holding portions 63 can be elastically deformed so as to be capable of approaching or being separated from the receiving-partitioning portions 61. That is, the inner diameter, which corresponds to the above-mentioned contact diameter and is formed by the cell holding portion 63 and the receiving-partitioning portion 61 (the side surface receiving-partitioning portions 611 and the upper surface receiving-partitioning portion 612), increase or decrease in accordance with the change of the position of the cell holding portion 63 relative to the receiving-partitioning portion 61.

In this way, the contact diameter (inner diameter), which is formed by the cell holding portion 63 and the receiving-partitioning portions 61, can increase when the battery cell 33 is held. Due to their elasticity, the cell holding portions 63 come into contact with the columnar outer peripheral surface 330 of the battery cell 33. The cell holding portions 63 pinch the columnar outer peripheral surface 330 between themselves and the receiving-partitioning portions 61. That is, the cell holding portions 63 act so as to press the columnar outer peripheral surfaces 330 of the battery cells 33 against the receiving-partitioning portions 61 when holding the battery cells 33.

The cell holding portion 63 is molded with an appropriate plastic resin so as to be elastically deformable. That is, the cell holding portion 63 includes one contact-curved portion 64 that corresponds to the columnar outer peripheral surface 330 of the battery cell 33, and two support-curved portions 65 and 66 that are provided at both ends of the one contact-curved portion 64. The contact-curved portion 64 is formed so as to have a gently curved shape that corresponds to the shape of the outer peripheral surface 330 of the battery cell 33. The contact-curved portion 64 mainly corresponds to the outer peripheral surface 330 of the battery cell 33, but is elastically deformable. That is, the contact-curved portion 64 can be bent into a linear shape from the gently curved shape. The contact-curved portion 64, which is bent as described above, can be elastically restored so that the shape of the contact-curved portion returns to the original gently curved shape.

Further, the two support-curved portions 65 and 66 are provided to extend from both ends of the contact-curved portion 64. The support-curved portions 65 and 66 are configured to have shapes that are symmetrical to each other with respect to the contact-curved portion 64. The support-curved portions 65 and 66 have a curved shape that is curved with a sharper angle than that of the contact-curved portion 64. Specifically, the support-curved portions 65 and 66 are configured so as to fold the end portions of the contact-curved portion 64 and form a circle. For this reason, the support-curved portions 65 and 66 are formed so as to be more elastically deformable than the contact-curved portion 64. The support-curved portions 65 and 66, which are formed as described above, are adapted to be capable of elastically supporting the contact-curved portion 64. That is, when the contact-curved portion 64 is pressed so that the above-mentioned contact diameter (inner diameter) increases, the support-curved portions 65 and 66 are bent first. The support-curved portions 65 and 66, which are bent as described above, act to be elastically restored so that the shapes of the support-curved portions return to the original curved shape. The elastic restoration actions of the support-curved portions 65 and 66 cause the contact-curved portion 64 to return to the original position of the contact-curved portion 64. That is, the contact-curved portion 64 returns to the original position so that the above-mentioned contact diameter (inner diameter) decreases, and presses the outer peripheral surface 330 of the battery cell 33.

Furthermore, the above-mentioned cell holder 50 is provided with extending leg portions 67 that extend toward the inner bottom 121 of the lower case 12. The extending leg portions 67 correspond to extending portions of certain embodiments of the invention. The extending leg portions 67 come into contact with the inner bottom 121 of the lower case 12. When a force is further applied to the extending leg portions 67, the extending leg portions 67 are bent. The bent extending leg portions 67 have elasticity that causes the extending leg portions to return to their original shape. Further, the extending leg portions 67 are provided between the first to fifth cell receiving portions 601 to 605. Furthermore, the extending leg portions 67 are provided at three portions in the left-and-right direction, i.e. at a right portion, an intermediate portion, and a left portion in the left-and-right direction. That is a right extending leg portion 671, an intermediate extending leg portion 672, and a left extending leg portion 673 are provided in each space between the first to fifth cell receiving portions 601 to 605. Meanwhile, the right extending leg portions 671, the intermediate extending leg portions 672, and the left extending leg portions 673 are also provided on the front wall portion 54 and the rear wall portion 55. The right extending leg portions 671, the intermediate extending leg portions 672, and the left extending leg portions 673 extend downward from the outer rim body 51 of the cell holder 50 so as to be divided at portions where the cell holding portions 63 are provided. Meanwhile, the right cell holding portion 631 is disposed between the right extending leg portion 671 and the intermediate extending leg portions 672. The left cell holding portion 632 is disposed between the intermediate extending leg portions 672 and the left extending leg portions 673. Further, the right extending leg portion 671 and the left extending leg portion 673 are provided at positions that are symmetrical to each other in a longitudinal direction of the battery cell 33. The extending leg portions 67 are formed so as to extend in the shape of an elastically deformable plate. The extending leg portions 67 extend from the above-mentioned outer rim body 51 and also are supported by the outer rim body 51.

In the battery pack 10 described above, certain effects can be obtained. The contact diameter is formed by the cell holding portion 63 and the receiving-partitioning portions 61. It is configured to be smaller than the diameter of the columnar outer peripheral surface 330 of the battery cell 33 and therefore the cell holding portion 63 comes into contact with the columnar outer peripheral surface 330 of the battery cell 33 so as to hold the columnar outer peripheral surface 330. In this way, the cell holding portions 63 can hold the battery cells 33 so that the battery cells are integrally coupled with the cell holder 50 at the cell receiving portions 60. Further, the cell holder 50 is supported by the case 11. Therefore, even when impact or vibration is applied to the battery pack 10 from the outside, the cell holder 50 supported by the case 11 and the battery cells 33 can be integrally moved. Therefore, it is possible to suppress the movement of the battery cells 33 relative to the case 11. Further, according to the above-mentioned battery pack 10, the contact diameter formed by the cell holding portion 63 and the receiving-partitioning portions 61 increases when the battery cell 33 is held. When this occurs, the battery cell 33 is pressed when held. Accordingly, the battery cells 33 can be elastically held by the cell holding portions 63. Therefore, even when impact or vibration is applied to the battery pack 10 from tire outside, the cell holder 50 supported by the case 11 can elastically support the battery cells 33 and can move integrally with the battery cells 33. In this way, the movement of the battery cells 33 relative to the case 11 can be further suppressed. Furthermore, in the above-mentioned battery pack 10, the cell holder 50 is provided with receiving-partitioning portions 61 that guide the battery cells 33 as they are inserted and housed. The battery cells 33 can be easily inserted and housed in the cell holder 50. Accordingly, the ease in inserting the battery cells 33 into the cell holder 50 can be improved. Further, in the above-mentioned battery pack 10, the receiving-partitioning portion 61 is formed so as to have a substantially C shaped-curved surface corresponding to the outer peripheral shape of the battery cell 33. This can aid in guiding the battery cell 33 inserted into the cell holder 50.

Furthermore, according to the above-mentioned battery pack 10, the cell holding portion 63 can come into contact with the battery cell 33 and support the battery cell 33 by the contact-curved portion 64 which is elastically supported by two support-curved portions 65 and 66 has a curved shape. Molding is used to create elastic cell holding portions 63 which can hold the battery cells 33. In this way, manufacturing costs can be reduced in creating elastic cell holding portions 63. Moreover, in the above-mentioned battery pack 10, the extending leg portions 67 are adapted to be capable of coming into elastic contact with the inner bottom 121 of the lower case 12. For this reason, when the cell holder 50 is supported from the inner bottom 121 of the lower case 12 with the extending leg portions 67 interposed therebetween, the cell holder 50 can be supported using cushioning. Even if impact or vibration applied from the outside is received, the cell holder 50 can be sufficiently supported by the case 11 and unification of the cell holder 50 and the case 11 can be maintained. Meanwhile, the above-mentioned extending leg portions 67 may be adapted to support the cell holder 50 with cushioning when receiving impact or vibration. For this purpose, the extending leg portions 67 may be adapted to be capable of coming into elastic contact with the inner surface of the case 11. The extending leg portions 67, however, do not necessarily need to constantly come into contact with the inner surface of the case 11. Further, since the extending leg portion 67 is provided as a part of the cell holding portion 63, it is possible to reduce space that is required for the extending leg portions 67. In this way, it is possible to efficiently provide the extending leg portions 67 without increasing the size of the battery pack 10. Furthermore, since the cell holding portions 63 and the extending leg portions 67 are provided at positions that are symmetrical to each other in the longitudinal direction of the battery cell 33, the battery cell 33 can be held in good balance.

As the front pressing rib 541 is formed integrally with the cell holder 50, the front pressing rib 541 can bridge a dimensional difference between the inside of the case 11 to be assembled and the cell holder by generating a pressing force on the front side. In other words, the cell holder 50 is pressed rearward in the case 11 by a pressing force of the front pressing rib 541 that is applied to the inside of the case 11. In this way, it is possible to bridge a dimensional difference between the case and the cell holder 50 in the case 11. The front pressing rib 541 is formed in the cell holder 50 by being molded integrally with the cell holder 50. It is preferably not formed as a separate member. In this way, it is possible to suppress the rattling of the cell holder 50 within the case 11, without increasing the number of parts. The front pressing rib 541 acts so as to bridge the dimensional difference from a time immediately before the cell holder 50 is completely assembled into the case 11. Contrastingly, the front pressing rib 541 does not act so as to bridge a dimensional difference until the time immediately before the cell holder 50 is assembled into the case 11. Therefore, it is possible to secure a time period for inserting the cell holder 50 is assembled into the case 11 before complete assembly is accomplished. Therefore, it is possible to easily put the cell holder 50 into the case 11. Moreover, since the front pressing rib 541 acts so as to bridge the dimensional difference when the cell holder 50 inserted into the case 11, the front pressing rib can bridge the clearance for complete assembly once when the cell holder 50 is inserted. Accordingly, it is possible to suppress the rattling of the cell holder 50 relative to the case 11. Therefore, while maintaining ease in insertion of the cell holder 50 into the case 11, it is possible to suppress the rattling of the cell holder 50. Further, since the front pressing rib 541 is provided at the base end of the cell holder in the assembling direction, the front pressing rib 541 does not cause interference until the cell holder 50 is completely assembled into the case 11. Accordingly, it is possible to sufficiently secure a clearance for assembly until after the cell holder 50 is inserted into the case 11. Therefore, it is possible to easily insert the cell holder 50 into the case 11. Furthermore, since the front pressing rib 541 is formed at the cell holder 50 by being molded integrally with the cell holder 50, it is possible to form the front pressing rib 541 in a simple manner. The front pressing rib 541 is formed at the front end of the cell holder in a direction orthogonal to the longitudinal direction of the battery cell 33. In this way, it is possible to bridge a dimensional difference between the inside of the case 11 and the cell holder by generating a pressing force on the front side and to set the rear side as a reference surface to which the cell holder 50 is fixed. Accordingly, the cell holder 50 can be accurately positioned to the case 11 to produce a battery pack.

Second Embodiment

Next, a battery pack 10A according to a second embodiment of the invention will be described below with reference to FIGS. 19 to 22. As described below in the second and fourth embodiments, battery packs 10A to 10C are created by modifying a part of the structure of the cell holder 50 of the battery pack 10 of the first embodiment. Differences between portions of cell holders 50A to 50C of the battery packs 10A to 10C in the second to fourth embodiments and the above-mentioned cell holder 50 will be described. Portions of the battery packs 10A to 10C according to the second to fourth embodiments, which are the same as portions of the battery pack 10 according to the above-mentioned first embodiment, are denoted in the drawings using the same reference numerals, and the description thereof will be omitted.

As shown in FIGS. 19 to 22, the cell holder 50A of the second embodiment is different from the cell holder 50 of the first embodiment in terms of the curved shapes of support-curved portions 65A and 66A. That is the curved shapes of the support-curved portions 65A and 66A of the second embodiment are formed so as to further protrude downward. Specifically, the support-curved portions 65A and 66A are formed so as to draw arcs more deeply when being turned over from the end portions of the contact-curved portion 64 at an angle of about 180°. Further, the support-curved portions 65A and 66A draw arcs to the lower side of the inner bottom 121 forming the inner surface of the lower case 12. The support-curved portions 65A and 66A, which are formed as described above, exhibit the same function as the extending leg portions 67 of the first embodiment.

Furthermore, the support-curved portions 65A and 66A draw arcs to the deeply lower side until being seated on the inner bottom. 121 of the lower case 12. For this reason, the bending amount of the support-curved portions 65A and 66A, when being bent, are configured to be larger than those of the support-curved portions 65 and 66 of the first embodiment when being bent. That is, the support-curved portions 65A and 66A, which are seated on the inner bottom 121 of the lower case 12, are configured to support the lower case 12, so that the cell holder 50 itself is elastically supported. For this reason, the support-curved portions 65A and 66A, which form a part of the cell holding portion 63, correspond to extending portions in certain embodiments, and the elastic restoration of the support-curved portions 65A and 66A is caused by the repulsion of the support-curved portions 65A and 66A. That is, even when a force is applied to the cell holder 50 and the support-curved portions 65A and 66A are bent, the cell holder 50 returns to the original state by elastic restoring forces of the support-curved portions 65A and 66A. That is, the cell holder 50 is elastically supported from the inner bottom 121 of the lower case 12 by the elastic restoration of the support-curved portions 65A and 66A.

In the battery pack 10A, since the support-curved portions 65A and 66A of the cell holding portion 63 are provided as the extending portions of the invention, other molded portions do not need to be added when the extending portions are provided. Accordingly, it is possible to simplify the molding of the cell holder 50. Further, since the elastic restoration of the support-curved portions 65A and 66A is caused by repulsion, it is possible to obtain elasticity through the molded shapes of the support-curved portions 65A and 66A. In this way, it is possible to provide the support-curved portions 65A and 66A, which function as the extending portions of the invention, in the cell holder 50 in a simple manner. Furthermore, the support-curved portions 65A and 66A can elastically support the contact-curved portion 64, the cell holder 50A, and the support-curved portions 65 and 66 of the above-mentioned first embodiment.

Third Embodiment

Next, a battery pack 10B for an electric power tool according to a third embodiment of the invention will be described below with reference to FIGS. 23 to 28.

As shown in FIGS. 23 to 28, the cell holder 50B of the third embodiment is different from the cell holder 50 of the first embodiment in terms of the arrangement structure of the dimensional difference interposition member of the invention. That is, in the first embodiment, only the front pressing rib 541 is provided as the dimensional difference interposition member at the front side of the cell holder 50. In contrast, dimensional difference interposition members of the third embodiment are formed at portions corresponding to four directions. They are formed on the front side, the rear side, the left side, and the right side of the cell holder 50. That is, the same front pressing rib 541 of the above-mentioned first embodiment is formed at the front wall portion 54 of the cell holder 50B of the third embodiment. Further, similar to the front pressing rib 541, a rear pressing rib 551 is also formed on the rear wall portion 55. Furthermore, similar to the front pressing rib 541, a right pressing rib 563 is also formed at the right wall portion 56 and a left pressing rib 573 is also formed at the left wall portion 57. The rear pressing rib 551, the right pressing rib 563, and the left pressing rib 573, which are formed as described above, have substantially the same function as that of the above-mentioned front pressing rib 541. That is, the front pressing rib 541, the rear pressing rib 551, the right pressing rib 563, and the left pressing rib 573 can bridge a dimensional difference between the cell holder SOB and the inside of the case 11.

The pressing ribs 541, 551, 563, and 573, which are formed as described above, may be produced by cutting out a part of the respective wall portions 54, 55, 56, and 57 of the cell holder 50B. In this case, it is possible to simply form the pressing ribs 541, 551, 563, and 573 on the cell holder 50. Further, the pressing ribs may be adapted to act so as to bridge a dimensional difference by the elasticity thereof when the cell holder 50 and the pressing ribs 541, 551, 563, and 573 are completely assembled into the case 11. Accordingly, it is possible to suppress the rattling of the cell holder 50B relative to the case 11. Therefore, it is possible to suppress the rattling of the cell holder 50B relative to the case 11 in which the cell holder 50B has been assembled.

Fourth Embodiment

Next, a battery pack 10C for an electric power tool according to a fourth embodiment of the invention will be described below with reference to FIGS. 29 to 35.

Figure 35:
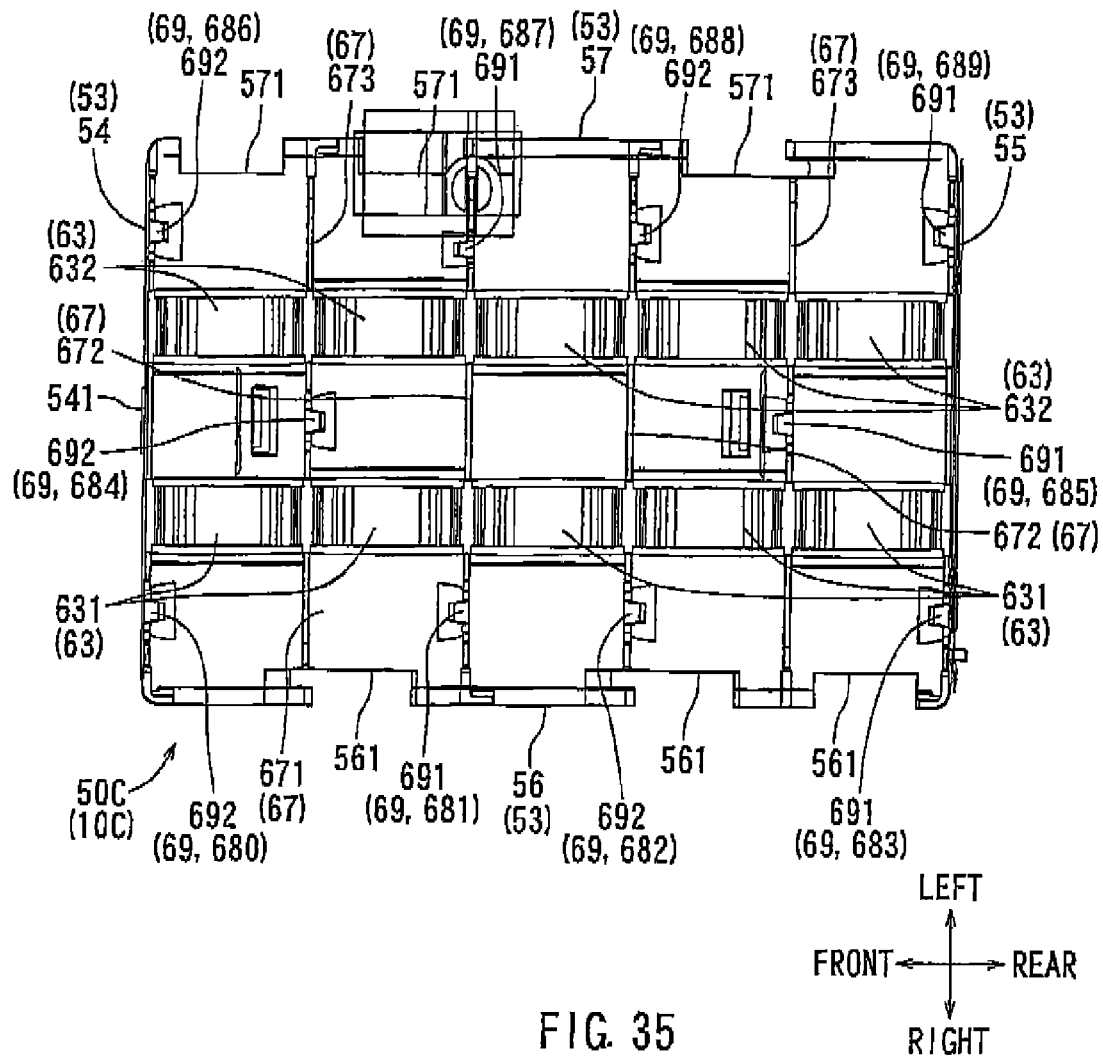
FIG. 35 is a bottom view of the cell holder of FIG. 29.

As shown in FIGS. 29 to 35, the cell holder 50C of the fourth embodiment is different from the cell holder 50 of the first embodiment in that the half of each of the extending leg portions 67 of the first embodiment is substituted with a flexible leg portion 68. As shown in FIG. 35, a flexible leg portion 68 may serve as a substitute for the following: each of a portion (denoted by reference numeral 680 in FIG. 35) of the right extending leg portion 671 that is connected to the front wall portion 54, a portion (denoted by reference numeral 681 in FIG. 35) of the right extending leg portion 671 that is provided between the second and third cell receiving portions 602 and 603, a portion (denoted by reference numeral 682 in FIG. 35) of the right extending leg portion 671 that is provided between the third and fourth cell receiving portions 603 and 604, and a portion (denoted by reference numeral 683 in FIG. 35) of the right extending leg portion 671 that is connected to the rear wall portion. Further, the flexible leg portion 68 may serve as a substitute for the following: each of a portion (denoted by reference numeral 684 in FIG. 35) of the intermediate extending leg portion 672 that is provided between the first and second cell receiving portions 601 and 602 and a portion (denoted by reference numeral 685 in FIG. 35) of the intermediate extending leg pardon 672 that is provided between the fourth and fifth cell receiving portions 604 and 605. Furthermore, the flexible leg portion 68 may serve as a substitute for the following: each of a portion (denoted by reference numeral 686 in FIG. 35) of the left extending leg portions 673 that is connected to the front wall portion 54, a portion (denoted by reference numeral 687 in FIG. 35) of the left extending leg portions 673 that is provided between the second and third cell receiving portions 602 and 603, a portion (denoted by reference numeral 688 in FIG. 35) of the left extending leg portions 673 that is provided between the third and fourth cell receiving portions 603 and 604, and a portion (denoted by reference numeral 689 in FIG. 35) of the left extending leg portions 673 that is connected to the rear wall portion 55.

Portions where the extending leg portion 67 are not substituted with the flexible leg portion 68 are to be the same as the extending leg portions 67 of the first embodiment. For this reason, the flexible leg portions 68 substituted for the extending leg portions 67 are provided so as to protrude downward from the cell holder 50. As shown in FIG. 35, the flexible leg portions 68, which are disposed as described above, are alternately disposed on the left and right sides not so as to be disposed adjacent to each other in the left-and-right direction. That is, the flexible leg portions 68 are configured to be arranged in a so-called zigzag pattern.

The flexible leg portion 68 is configured to extend below the extending leg portion 67. Further, the flexible leg portion 68 is formed so as to be tapered toward the lower end. At the lower ends of the flexible leg portions 68, bendable portions 691 and 692, which have a so-called bending inclination, are provided. The bendable portions 691 and 692 are formed so that the bending directions of the lower ends are guided when the lower ends of the flexible leg portions 68 are bent. Specifically, the bendable portions 691 and 692 are formed to be gently bent forward or rearward. The bendable portions 691 and 692 include two kinds of easily bendable portions, that is, forward bendable portions 691 and rearward bendable portions 692.

Since the forward bendable portions 691 are formed so that the bending direction of the lower end of the flexible leg portion 68 is directed to the front side, the bending direction of the lower end is guided so as to be directed to the front side. In contrast, the rearward bendable portions 692 are formed so that the bending direction of the lower end of the flexible leg portion 68 is directed to the rear side, and the bending direction of the lower end is guided so as to be directed to the rear side. Further, the bendable portions 691 and 692 are configured so that the flexible leg portions 68 arranged in parallel in the front-and-rear direction are bent so as to face each other. Specifically, reference numeral 680, reference numeral 682, reference numeral 684, reference numeral 686, and reference numeral 688 of the flexible leg portion 68 are configured to be the rear easily bendable portions 692. Further, reference numeral 681, reference numeral 683, reference numeral 685, reference numeral 687, and reference numeral 689 of the flexible leg portion 68 are configured to be the forward bendable portions 691.

The forward bendable portions 691 and the rearward bendable portions 692 are provided at the flexible leg portions 68, which are formed as described above, so as to face each other. Accordingly, even when the cell holder 50 is moved by a reaction against the bending of the flexible leg portions 68, the forces of the flexible leg portions can be cancelled. That is, the flexible leg portions 68 can sufficiently provide a cushioning function with regard to the movement of the cell holder 50. Meanwhile, when the flexible leg portions 68 are configured as described above, the extending leg portions 67, which are not substituted with the flexible leg portions 68, function to prevent the battery cells 33 from reaching the bottom. That is, when the cell holder 50 is moved up and down by the flexible leg portions 68, the lower ends of the extending leg portions 67 reach the inner bottom 121 of the lower case 12 at the position of the lower end of the cell holder 50 before the battery cells 33 reach the inner bottom 121 of the lower case 12. Accordingly, the battery cells 33 are prevented from reaching the bottom.

The battery pack for an electric power tool according to the invention is not limited to the above-mentioned embodiments, and appropriate portions thereof may be modified as follows: that is, the number of the battery cells is five in the above-mentioned embodiment, but the number of the battery cells of the invention is not limited thereto and may be appropriately determined. Further, the number of the lead plates to be disposed may be determined according to the number of the battery cells.

Furthermore, in the above-mentioned embodiments, the front pressing rib 541 is provided at the edge of the base end (base end edge) of the cell holder 50 in an assembling direction when the cell holder 50 is assembled into the lower case 12. However, the dimensional difference interposition member of the invention may be provided at another portion of the cell holder 50 in the assembling direction. Further, as long as the cell holder 50 can be inserted with relative ease into the case 11 while a clearance for assembling can be sufficiently secured when the cell holder 50 is assembled into the ease 11, the dimensional difference interposition member may be appropriately provided at any position. Furthermore, the dimensional difference interposition member of the invention is not limited to an example where the dimensional difference interposition member is provided at the cell holder 50 as in the above-mentioned embodiments, and may be provided in the case 11. Even in this case, the dimensional difference interposition member may be provided at any position within the case 11.

Moreover, in the above-mentioned embodiments, the charge/discharge terminal 44 serves as a discharge terminal when the battery pack 10 is mounted on a tool body as a power source, and a charge terminal when the battery pack 10 is mounted on a dedicated charger. That is, the charge/discharge terminal 44 is used to charge and to discharge the battery pack 10. However, the charge/discharge terminal is not limited to such a common terminal, and a discharge terminal and a charge terminal may be separately prepared.

I claim:

1. A battery pack for an electric power tool that is detachably mounted on a tool body of the electric power tool for serving as a power source for the electric power tool, the battery pack comprising:
   a case;
   battery cells; and
   a cell holder that is inserted into the case, the cell holder covering at least a part of the battery cells, wherein
   a dimensional difference interposition member serves to bridges a dimensional difference between the cell holder and the inside of the case by generating a pressing force applied to the case when the cell holder is inserted;
   the dimensional difference interposition member being molded integrally with the cell holder; and
   the dimensional difference interposition member is formed as a cutout in the cell holder, and serves to bridge the dimensional difference by the elasticity thereof when the cell holder is completely inserted into the case.

2. The battery pack for an electric power tool according to claim 1,
   wherein the dimensional difference interposition member serves to bridge the dimensional difference while the cell holder is inserted into the case, and serves to completely bridge the dimensional difference when the cell holder is completely inserted into the case.

3. The battery pack for an electric power tool according to claim 1,
   wherein the dimensional difference interposition member is provided at a forward position or a rearward position with respect to an insertion direction of the cell holder into the case.

4. The battery pack for an electric power tool according to claim 1,
   wherein the dimensional difference interposition member is formed in at least one opposite end along a direction orthogonal to the longitudinal direction of the battery cell.

5. The battery pack for an electric power tool according to claim 1,
   wherein the dimensional difference interposition member is formed in at least one opposite end along the longitudinal direction of the battery cell.

6. A battery pack for an electric power tool that is detachably mountable on a tool body of the electric power tool for serving as a power source for the electric power tool, comprising:
   a case;
   battery cells; and
   a cell holder that is inserted into the case, the cell holder covering at least a part of the battery cells, wherein:
   a dimensional difference interposition member serves to bridge a dimensional difference between the cell holder and the inside of the case by generating a pressing force applied to the case when the cell holder is inserted;
   the dimensional difference interposition member is integrally molded with the cell holder; and
   the dimensional difference interposition member is only provided at a forward position or a rearward position with respect to an insertion direction of the cell holder into the case.

7. The battery pack for an electric power tool according to claim 1, wherein the dimensional difference interposition member is formed at a front end of the cell holder in a direction orthogonal to the longitudinal direction of the battery cells and configured to generate the pressing force on a front side of the case such that a rear end of the cell holder contacts a rear side of the case.

8. The battery pack for an electric power tool according to claim 6, wherein the dimensional difference interposition member is formed at a front end of the cell holder in a direction orthogonal to the longitudinal direction of the battery cells and configured to generate the pressing force on a front side of the case such that a rear end of the cell holder contacts a rear side of the case.

* * * * *